US012659610B2

(12) United States Patent (10) Patent No.: US 12,659,610 B2
Berner et al. (45) Date of Patent: Jun. 16, 2026

(54) IMAGE SENSOR INCLUDING PIXEL CIRCUITS FOR EVENT DETECTION CONNECTED TO A COLUMN SIGNAL LINE

(71) Applicant: Sony Semiconductor Solutions Corporation, Atsugi (JP)

(72) Inventors: Raphael Berner, Stuttgart (DE); Eshar Ben Dor, Stuttgart (DE)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 21 days.

(21) Appl. No.: 18/842,419

(22) PCT Filed: Mar. 7, 2023

(86) PCT No.: PCT/EP2023/055755
§ 371 (c)(1),
(2) Date: Aug. 29, 2024

(87) PCT Pub. No.: WO2023/186468
PCT Pub. Date: Oct. 5, 2023

(65) Prior Publication Data
US 2025/0184628 A1     Jun. 5, 2025

(30) Foreign Application Priority Data

Mar. 31, 2022    (EP) .................................... 22165950

(51) Int. Cl.
H04N 25/47          (2023.01)
H04N 25/709         (2023.01)
(Continued)

(52) U.S. Cl.
CPC .......... H04N 25/47 (2023.01); H04N 25/709 (2023.01); H04N 25/77 (2023.01); H04N 25/78 (2023.01)

(58) Field of Classification Search
None
See application file for complete search history.

(56) References Cited

U.S. PATENT DOCUMENTS

2016/0094787 A1*   3/2016  Govil ...................... H10F 39/18
                                                          348/310
2018/0189959 A1    7/2018  Berner et al.
                           (Continued)

FOREIGN PATENT DOCUMENTS

EP          2124336 A1    11/2009
WO      2021/166503 A1     8/2021

OTHER PUBLICATIONS

International Search Report and Written Opinion mailed on May 23, 2023, received for PCT Application PCT/EP2023/05575, filed on Mar. 7, 2023, 15 pages.

*Primary Examiner* — James M Hannett
(74) *Attorney, Agent, or Firm* — XSENSUS LLP

(57)             ABSTRACT

An image sensor includes a plurality of pixel circuits for event detection, wherein each pixel circuit includes at least one output transistor and at least one selection transistor electrically connected in series between at least one pixel output and a first supply potential. A column signal line electrically connects the pixel outputs of the plurality of pixel circuits. A comparator/latch circuit is configured to receive a signal derived from a pixel event signal transmitted on the column signal line at a first comparator input, and to output a latched active column event signal, when the signal at the first comparator input exceeds or falls below a threshold voltage applied to a second comparator input of the comparator/latch circuit.

15 Claims, 26 Drawing Sheets

(51) Int. Cl.
    *H04N 25/77*        (2023.01)
    *H04N 25/78*        (2023.01)

(56)           References Cited

U.S. PATENT DOCUMENTS

2018/0191972 A1 *  7/2018  Berner ................... H04N 25/77
2020/0084403 A1     3/2020  Suh et al.
2020/0212902 A1 *  7/2020  Zhang .................. H03K 5/2481
2021/0337151 A1   10/2021  Berner et al.
2022/0394206 A1 *  12/2022  Hanzawa ............... H04N 25/70

* cited by examiner

IMAGE SENSOR INCLUDING PIXEL CIRCUITS FOR EVENT DETECTION CONNECTED TO A COLUMN SIGNAL LINE

CROSS-REFERENCE TO RELATED APPLICATIONS

The present application is based on PCT filing PCT/EP2023/055755, filed Mar. 7, 2023, which claims priority from European Patent Application No. 22165950.1, filed Mar. 31, 2022, the entire contents of each are incorporated herein by reference.

FIELD OF THE INVENTION

The present disclosure relates to an image sensor. More particularly, the present disclosure relates to image sensors with event detection pixels that respond to changes in light intensity, such as dynamic vision sensors (DVS) and event-based vision sensors (EVS).

BACKGROUND

Computer vision is concerned with how machines and computers can extract a high level of relevant information from digital images or video. Typical computer vision methods aim to extract, from raw image data obtained by an image sensor, exactly the kind of information the machine or computer uses for other tasks.

Many applications of image sensors such as machine control, process monitoring, or surveillance cameras are based on evaluating the motion of objects in the imaged scene. Conventional image sensors with a large number of pixels arranged in an array provide a sequence of still images (frames). The detection of moving objects in the sequence of frames typically involves elaborate and complex image processing methods.

Event detection sensors like DVS and EVS tackle the problem of motion detection by delivering information only about the position of changes in the imaged scene. Unlike image sensors that transfer large amounts of image information in frames, transfer of information about pixels that do not change can be omitted, resulting in a sort of in-pixel data compression. The in-pixel data compression removes data redundancy and facilitates high temporal resolution, low latency, low power consumption, high dynamic range and little motion blur. DVS and EVS are thus well suited especially for solar or battery powered compressive sensing or for mobile machine vision applications where the motion of the system including the image sensor has to be estimated and where processing power is limited due to limited battery capacity. In principle, the architecture of DVS and EVS allows for high dynamic range and good low-light performance, in particular in the field of computer vision.

SUMMARY OF INVENTION

A pixel circuit of an image sensor implementing event detection typically includes a photoreceptor conversion block (photoreceptor module) and an event detector circuit. The photoreceptor conversion block includes at least one photoelectric conversion element per pixel. The photoelectric conversion elements are typically arranged in rows and columns. Each photoreceptor conversion block outputs a photoreceptor signal, wherein a voltage level of the photoreceptor signal depends on the intensity of electromagnetic radiation detected by the photoelectric conversion element.

The event detector circuit processes the photoreceptor signal and generates event data each time a change in intensity of the electromagnetic radiation exceeds a preset threshold. The event data of all pixel circuits of the same pixel column are output on a common column signal line.

A column readout circuit detects the event data on the column signal lines and compiles event information from the received event data, wherein the event information may include information whether the light intensity has increased or decreased. The readout circuit may control the readout of the event data from the various pixel circuits at regular time intervals or on request. Even for the event-driven output, for some applications the readout of such image sensors may still not be fast enough, for example when capturing motion-rich scenes.

The present disclosure mitigates such shortcomings of conventional image sensors for event detection.

To this purpose, an image sensor according to the present disclosure includes a plurality of pixel circuits for event detection, wherein each pixel circuit includes at least one output transistor and at least one selection transistor electrically connected in series between at least one pixel output and a first supply potential. A column signal line electrically connects the pixel outputs of the plurality of pixel circuits. A comparator/latch circuit is configured to receive a signal derived from a pixel event signal transmitted on the column signal line at a first comparator input, and to output a latched active column event signal, when the signal at the first comparator input exceeds or falls below a threshold voltage applied to a second comparator input of the comparator/latch circuit.

Conventionally, the column readout circuit includes a CMOS inverter for detecting a signal state on the column signal line. The switching point of a CMOS inverter may fluctuate in response to temperature changes and/or fluctuations of the power supply voltage. For reliable detection of event data on a column signal line within a predetermined time interval, a voltage swing of the event data is designed to be significantly larger than a fluctuation span of the CMOS inverter switching point. Typically, the voltage swing is selected to be larger than half of the pixel supply voltage. On the other hand, the slew rate of the column signal line is given by the dimensions of the output transistor.

In the image sensor according to the present disclosure, the comparator/latch circuit may completely replace the CMOS inverter. A switching threshold of the comparator/latch circuit can be adjusted more precisely than that of a CMOS inverter and is more robust against fluctuations of the power supply voltage and the temperature. The voltage swing for the voltage signals on the column signal line can be reduced.

The described embodiments, together with further advantages, will be best understood by reference to the following detailed description taken in conjunction with the accompanying drawings.

BRIEF DESCRIPTION OF THE DRAWINGS

FIG. 16 shows a simplified circuit diagram of a portion of an image sensor having a comparator/latch circuit connected to two column signal lines transmitting complementary signals according to an embodiment.

FIG. 17 shows a simplified circuit diagram of a portion of an image sensor according to an embodiment having a comparator/latch circuit connected to two column signal lines transmitting complementary signals, and a supplementary switch element between the two column signal lines.

FIG. 18 shows a simplified circuit diagram of a portion of an image sensor according to an embodiment having a comparator/latch circuit connected to two column signal lines transmitting complementary signals, and a memory element in the output leg of the comparator/latch circuit.

FIG. 19 shows a simplified circuit diagram of a portion of an image sensor according to an embodiment having a comparator/latch circuit connected to two column signal lines transmitting complementary signals, and a differential amplifier circuit in the input legs of the comparator/latch circuit.

DETAILED DESCRIPTION

Embodiments for implementing techniques of the present disclosure (also referred to as "embodiments" in the following) will be described below in detail using the drawings. The techniques of the present disclosure are not limited to the embodiments, and various numerical values and the like in the embodiments are illustrative. In the following description, the same elements or elements with the same functions are denoted by the same reference signs, and duplicate descriptions are omitted.

Connected electronic elements may be electrically connected through a direct, permanent low-resistive connection, e.g., through a conductive line. The terms "electrically connected" and "signal-connected" may also include a connection through other electronic elements provided and suitable for permanent and/or temporary signal transmission and/or transmission of energy. For example, electronic elements may also be electrically connected or signal-connected through electronic switches such as transistors or transistor circuits, e.g. MOSFETs, transmission gates, and others.

Though in the following a technology for fast data readout from image sensors is described in the context of certain types of image sensors for event detection, the technology may also be used for other types of image sensors, e.g. such image sensors that combine event detection and intensity read-out.

Figure 1:
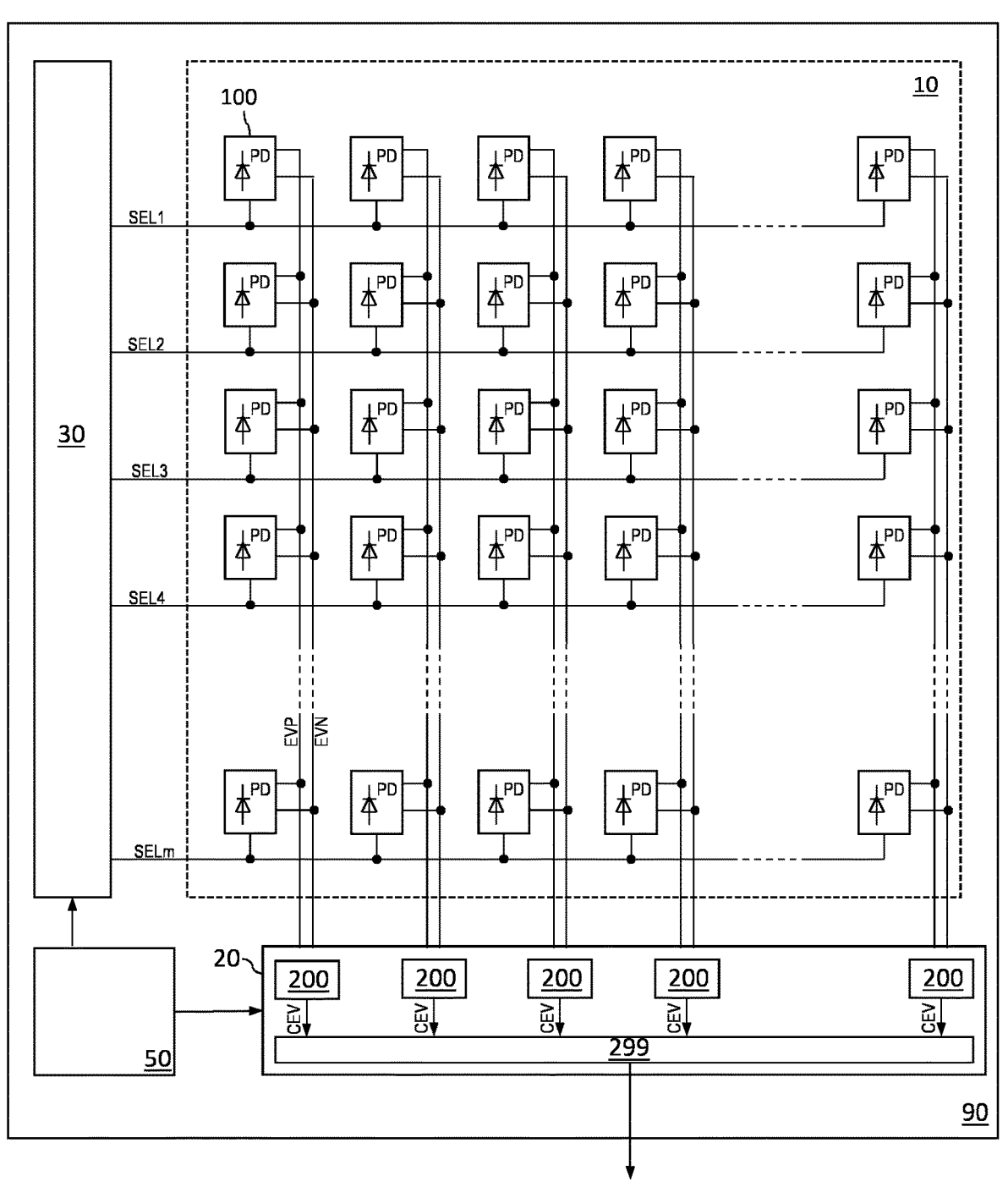
FIG. 1 shows a simplified block diagram of an image sensor that includes event detection pixel circuits and column readout circuits having comparator/latch circuits according to an embodiment the present disclosure.

FIG. 1 is a block diagram of an image sensor 90 for event-based image detection. The image sensor 90 includes a pixel array unit<including a plurality of pixel circuits 100.

Each pixel circuit 100 includes a photoreceptor module with at least one photoelectric conversion element PD. Each pixel circuit 100 converts electromagnetic radiation impinging onto a detection area of the photoelectric conversion element PD into digital, e.g. binary event data, wherein the event data indicates an event. Each event indicates a change of the received radiation energy, e.g. an increase by at least an upper threshold amount and/or a decrease by at least a lower threshold amount. Each pixel circuit 100 temporarily stores the event data until the event data is read out. The active pixel event signal may include one or more active signals transmitted through a communication interface with one, two or more signal lines.

A first active pixel event signal may indicate that an increase in illumination energy between a previous exposure and a new exposure is higher than a predefined threshold. A second active pixel event signal may indicate that a drop in illumination energy between a previous exposure and a new exposure is higher than a predefined threshold.

Control signals transmitted on row control lines control the pixel circuits 100. The pixel circuits 100 output the pixel event signals on column signal lines 191.

The pixel array unit 11 may be a two-dimensional array, wherein each subset of pixel circuits 100 electrically connected to the same column signal line(s) form a pixel column, and wherein each subset of pixel circuits 100 electrically connected to the same row control line(s) form a pixel row. The photoelectric conversion elements PD of the same pixel row may be formed on straight or meandering first lines. The photoelectric conversion elements PD of the same pixel column may be formed on straight or meandering second lines, wherein the first lines run orthogonal to the second lines.

The row control lines electrically connect the pixel circuits 100 of the same pixel row with a pixel address unit 30. The pixel address unit 30 generates control signals that control the pixel circuits 100.

The column signal lines 191 electrically connect the pixel circuits 100 of the pixel array unit 10 with column readout circuits 200 of a column readout circuit 20. The first and second pixel event signals may be transmitted in a time-multiplex regime, or as trinary signals on the same column signal line 191, or may be transmitted on two different column signal lines 191.

Each column readout circuit 200 receives the pixel event signals of all pixel circuits 100 electrically connected to the same pixel row and passes column event information CEV to a readout buffer 299. The column event information CEV includes pixel events of all pixel circuits 100 electrically connected to the same column signal lines.

Each pixel circuit 100 of the pixel array unit 11 can be identified by a pixel address. The pixel address may include a column address describing the position of the pixel circuit 100 along the row direction and a row address identifying the position of the pixel circuit 100 along the column direction.

A controller 50 controls the pixel address unit 30 and the column readout circuit 20. The controller 50 may control the pixel address unit 30 and the column readout circuit 20 to perform a sequential readout, or an event-triggered readout.

For the event-based readout, the pixel address unit 30 and/or the column readout circuit resets the pixel event signal by selectively acknowledging the event signals and storing address information. The controller 50 coordinates assembling an event/address representation (AER) for each event by collecting address information from the pixel address unit 30 and the column readout circuit 20 and supplementing the address information with time information and information about the type of event, such that the readout buffer 299 outputs a stream of event/address data AER to a signal processing unit outside the image sensor 90.

For the sequential readout, the pixel address unit 30 scans the pixel array unit 11 for events according to a periodic scheme, e.g. by successively selecting the pixel circuits 100 row-by-row. The readout buffer 299 sequentially receives the event signals and outputs the pixel event signals in a predefined order. Alternatively, the readout buffer 299 may latch the event data of the pixel circuits 100 and may generate event/address data for all pixel circuits 100 whose event data indicate an event.

In addition, the controller 50 may control a threshold voltage generation circuit that determines and supplies one or more reference voltages to individual pixel circuits 100 in the pixel array unit 11, wherein the pixel circuits 100 may use the reference voltage or voltage signals derived from the reference voltage as threshold voltages for comparison decisions. For example, the threshold voltage generation unit may generate the lower and upper threshold voltages and may supply the lower and upper threshold voltages through threshold voltage lines to all pixel circuits 100 of the pixel array unit 11.

Figure 2A:
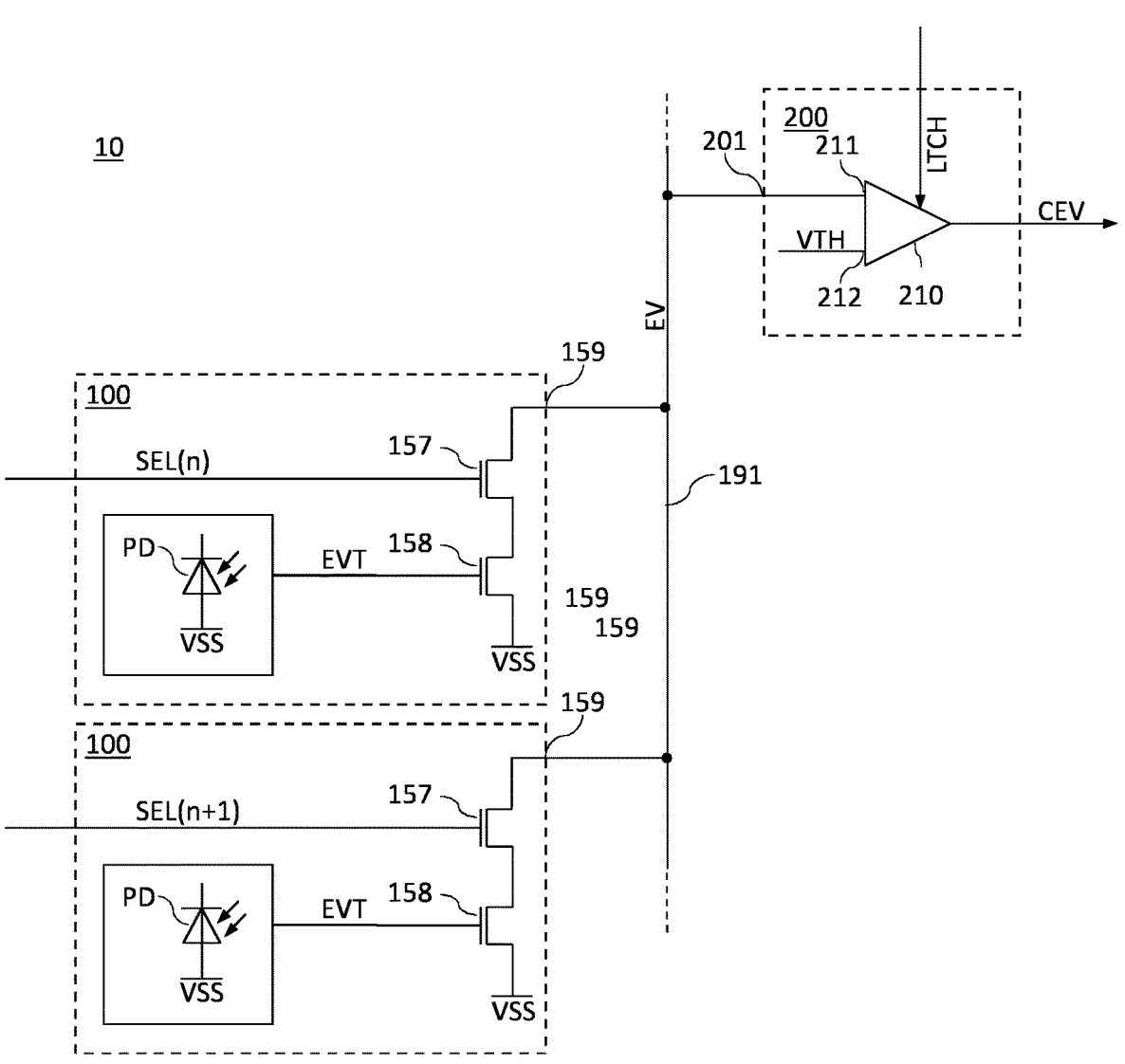
FIG. 2A shows a simplified block diagram of a portion of an image sensor having event detection pixel circuits connected to one column signal line, and column readout circuits having comparator/latch circuits according to an embodiment the present disclosure.
Figure 2B:
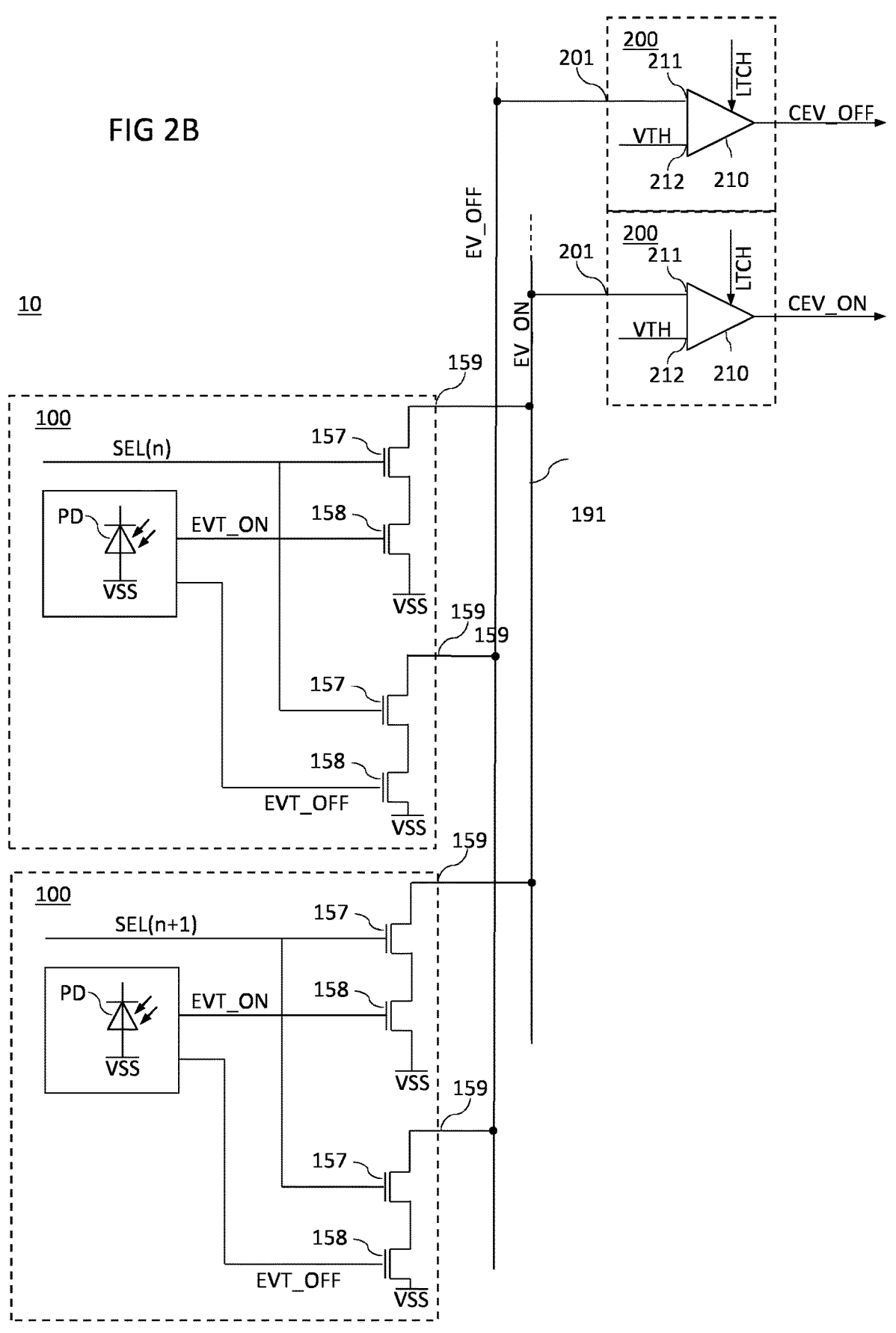
FIG. 2B shows a simplified circuit diagram of a portion of an image sensor having event detection pixel circuits connected to two column signal lines, and column readout circuits having comparator/latch circuits according to an embodiment the present disclosure.

Each of FIG. 2A and FIG. 2B shows a portion of an image sensor 10 that includes a plurality of pixel circuits 100 for event detection, wherein each pixel circuit 100 includes at least one output transistor 158 and at least one selection transistor 157 electrically connected in series between at least one pixel output 159 and a first supply potential VSS. A column signal line 191 electrically connects the pixel outputs 159 of the plurality of pixel circuits 100. A comparator/latch circuit 210 receives a signal derived from a pixel event signal EV transmitted on the column signal line 191 at a first comparator input 211, and outputs a latched active column event signal CEV, when the signal at the first comparator input 211 exceeds or falls below a threshold voltage VTH applied to a second comparator input 212 of the comparator/latch circuit 210.

Each pixel circuit 100 includes an event detection circuit including a photoelectric conversion element PD. The event detection circuit outputs an active pixel event signal EVT, when a change in illumination energy exceeds a predefined upper threshold and/or falls below a predefined lower threshold. The pixel event signal EVT is inactive, as long as the change in illumination energy does not reach any of the predefined thresholds. The pixel event signal EVT is passed to the gate of the output transistor 158. An active pixel event signal EVT turns on the output transistor 158.

The pixel circuits 100 receive select signals SEL(n), SEL(n+1) that are applied to the gates of the selection transistors 157. Each select signal SEL(n), SEL (n+1) has an active voltage level and an inactive voltage level. An active select signal SEL(n), SEL(n+1) turns on the selection transistors 157 of the same pixel row and selects one pixel circuit 100 of a pixel column.

The column signal line 191 is electrically connected to a first input 201 of a column readout circuit 200 that includes the comparator/latch circuit 210. The column signal line 191 may be electrically connected through a load circuit to a higher (positive) second supply potential at the side of the connection to the comparator/latch circuit 210.

When a pixel circuit 100 is selected that has detected a sufficiently strong change of the illumination energy, the output transistor 158 and the selection transistor 157 pull down the voltage on the column signal line 191 to the lower (negative) first supply potential VSS, wherein an active event signal EV is generated on the column signal line 191.

The first comparator input 211 of the comparator/latch circuit 210 receives the event signal passed through the column signal line 191 to the first input of the column readout circuit. With a change of the latch signal LTCH from inactive to active, the comparator/latch circuit latches the result of a comparison between the voltage level on the column signal line 191 and the threshold voltage VTH and outputs a latched column event signal CEV. The latched column event signal CEV has an active voltage level, when the signal at the first comparator input 211 falls below the threshold voltage VTH, and has an inactive voltage level otherwise.

Compared to a CMOS converter, the comparator/latch circuit 210 allows a fast and reliable detection of active event signals EV despite the comparatively high parasitic capacity of the column signal line 191. Temperature fluctuations and fluctuations of the power supply have no or only marginal impact.

FIG. 2A refers to pixel circuits 100 that transmit the results of the comparisons of the change in illumination energy with the predefined upper threshold and the predefined lower threshold in a time-multiplex regime on the same column signal line 191, and/or that transmit the result of an OR operation between the comparison with the predefined upper threshold and the predefined lower threshold on a column signal line 191. Each pixel circuit 100 includes one transistor pair with one output transistor 158 and one selection transistor 157 electrically connected in series.

FIG. 2B refers to pixel circuits 100 that transmit the results of the comparisons of the change in illumination energy with the predefined upper threshold and the predefined lower threshold on two different column signal lines 191.

Each pixel circuit 100 includes two transistor pairs with one output transistor 158 and one selection transistor 157 electrically connected in series.

A first one of the transistor pairs outputs the results of the comparison of the change in illumination energy with the predefined upper threshold ("pixel on events"). The column signal line 191 connecting the pixel outputs 159 of the first transistor pair pass pixel on-event signals EV_ON to a first comparator/latch circuit 210.

A second one of the transistor pairs outputs the results of the comparison of the change in illumination energy with the predefined lower threshold ("pixel off events"). The column signal line 191 connecting the pixel outputs 159 of the second transistor pair pass pixel off-event signals EV_OFF to a second comparator/latch circuit 210.

The following embodiments show only one column signal line 191 for simplicity only, wherein the shown column signal line 191 may be the single column signal line 191 of embodiments with one column signal line 191 as shown in FIG. 2A, or one of the two column signal lines 191 of embodiments with two column signal lines 191 as shown in FIG. 2B.

Figure 3A:
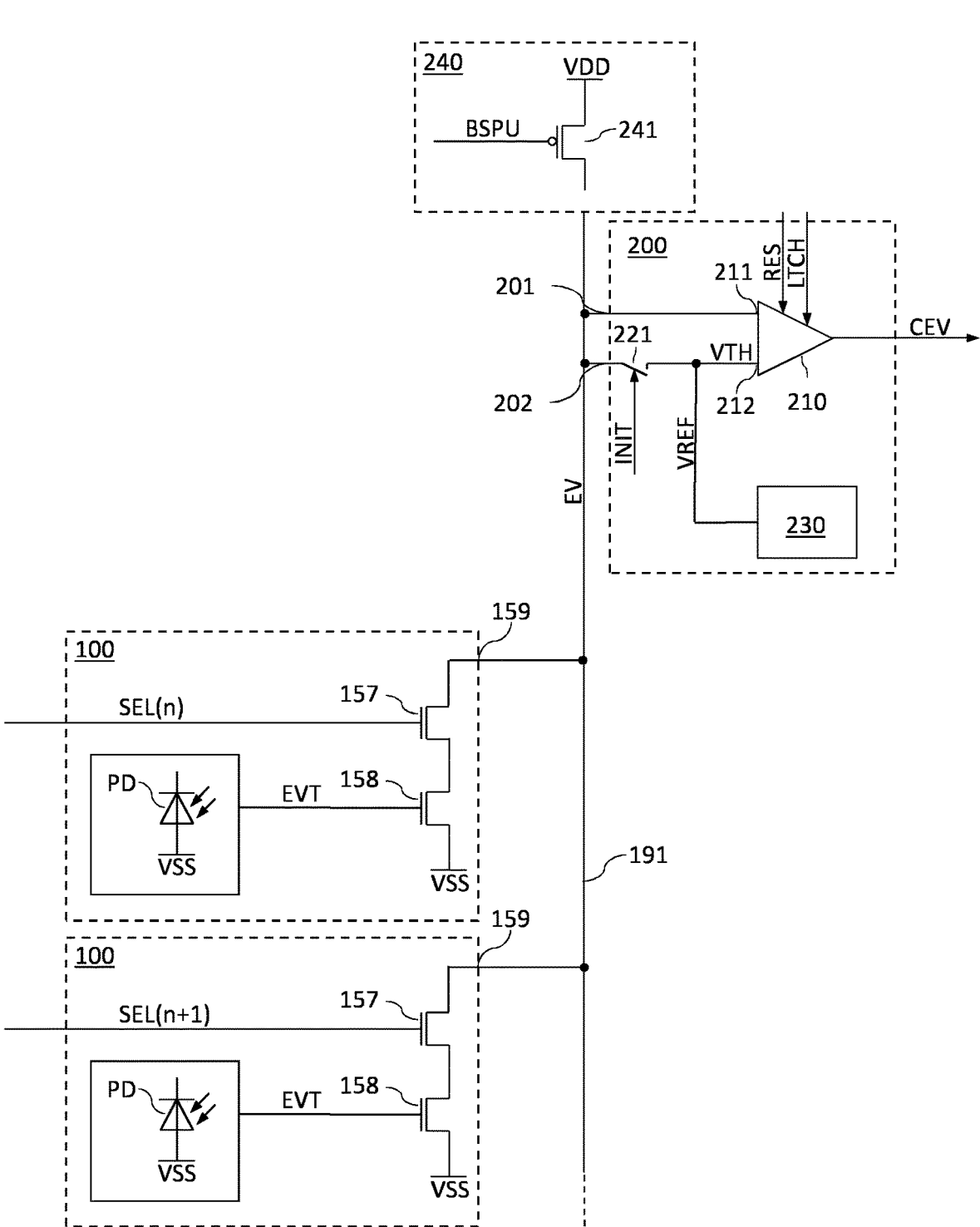
FIGS. 3A and 3B show a simplified circuit diagram of a portion of an image sensor according to an embodiment having a column readout circuit including a reference voltage source connected to an input of a comparator/latch circuit, and a time diagram for internal signals of the image sensor.

In FIG. 3A, the column readout circuit 200 includes a first switch element 221 that electrically couples the column signal line 191 and the second comparator input 212 via a low impedance path in response to an initialization signal INIT.

The first switch element 221 may be or may include an FET. The initialization signal INIT has an active signal level and an inactive signal level. An active initialization signal turns on the first switch element 221 and sets the column signal line 191 to a defined potential.

A reference voltage source 230 generates a constant reference voltage VREF, wherein the threshold voltage VTH is derivable from the reference voltage VREF.

The reference voltage source 230 may include a bandgap reference voltage source or may include a resistor ladder electrically connected between a high potential and a low potential of a stabilized supply voltage unit, wherein the reference voltage is tapped from one of the nodes of the resistor ladder. In the illustrated embodiment, the threshold voltage VTH may be equal to the reference voltage VREF.

A current source circuit 240 including a current source transistor 241 is electrically connected between the column signal line 191 and the positive second supply potential VDD. The current source transistor 241 provides a load (pull-up) for the output transistor 158 of the selected pixel circuit 100 and may include or consist of a pFET receiving a constant bias voltage BSPU at the gate.

The comparator/latch circuit 210 further receives a reset signal RES. The reset signal RES has an active voltage level and an inactive voltage level. An active reset signal RES initializes the latch portion of the comparator/latch circuit 210.

Figure 3B:
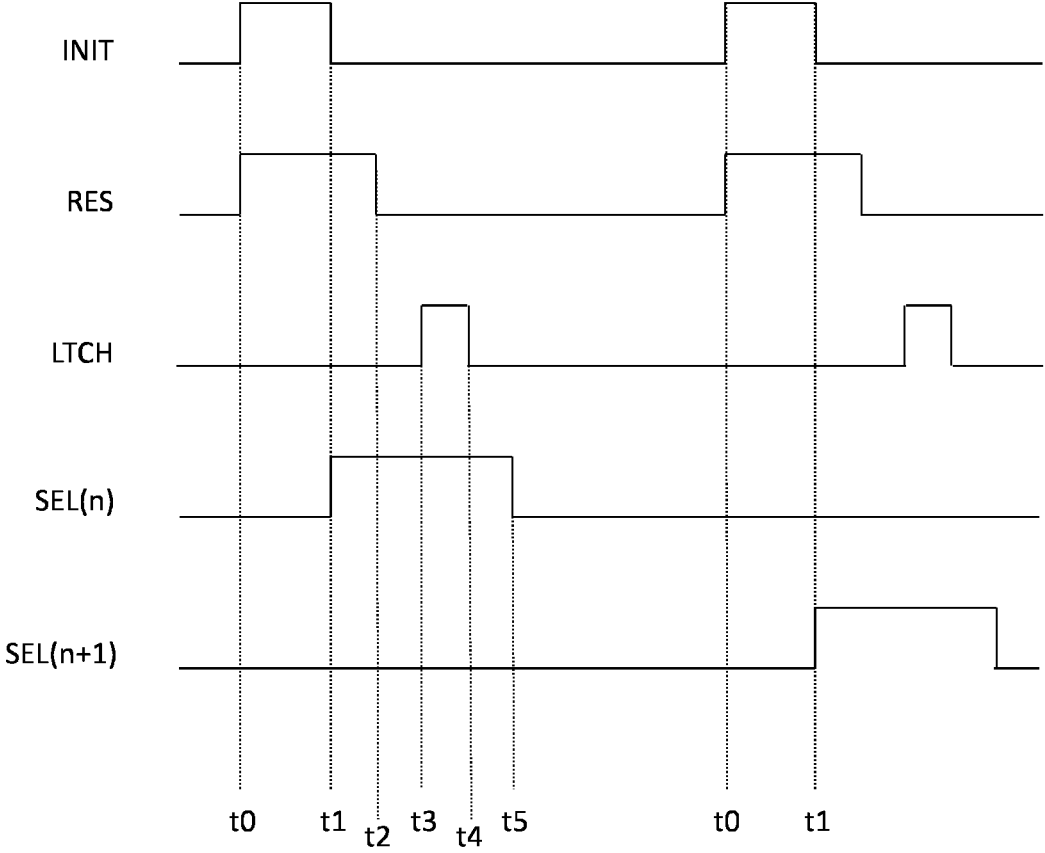

The controller 50 of FIG. 1 controls the select signals SEL(n), SEL(n+1), . . . , the initialization signal INIT, the reset signal RES, and the latch signal LTCH as illustrated in FIG. 3B. Active voltage levels (active signals) are indicated by the high signal level ("1"). Inactive voltage levels (inactive signals) are indicated by the low signal level ("0").

At t=t0, a readout cycle starts and an active initialization signal INIT turns on the first switch element 221 such that the potential on the column signal line 191 is set to the reference voltage VREF. An active reset signal RES initializes the internal latches of the comparator/latch circuit 210.

At t=t1 the initialization signal INIT becomes inactive and releases the potential on the column signal line 191. In addition, an active selection signal SEL(n) selects the n-th pixel row. In case the selected pixel circuit 100 has detected an event, the active pixel signal EV turns on the output transistor 158 which in turn starts to pull down the potential on the columns signal line 191, after the reset signal RES becomes inactive at t=t2

At t=t3, after a comparatively short waiting time, which is selected to ensure a sufficiently high voltage drop for the case a pixel circuit 100 transmits an active pixel event signal, an active latch signal LTCH latches the result of the comparison between the potential on the column signal line 191 and the threshold voltage VTH. The comparator/latch circuit 210 latches and stores an active column event signal CEV, when at the time of latching a voltage difference between the column signal line 191 and the threshold voltage VTH exceeds a predefined minimum voltage difference of about 100 mV. The latch signal LTCH becomes inactive at t=t4, the selection signal SEL(n) becomes inactive at t=t5. The readout cycle ends with the start of the readout cycle for the next pixel row at the next t=t0.

The following examples concern various embodiments of the current source circuit 240 and the connection of the column signal lines 191 to the positive supply voltage VSS.

Figure 4:
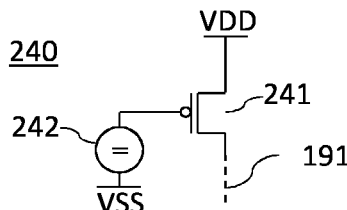
FIG. 4 shows a simplified circuit diagram of a current source circuit according to an embodiment having a constant voltage source supplying a constant bias voltage to a gate of a current source transistor.

In FIG. 4, the current source circuit 240 includes a constant voltage source 242 supplying a constant bias voltage to a gate of the current source transistor 241.

The constant voltage source 242 may include a bandgap reference voltage source or may include a resistor ladder electrically connected between a high potential and a low potential of a stabilized supply voltage unit, wherein the reference voltage is tapped from one of the nodes of the resistor ladder.

Figure 5:
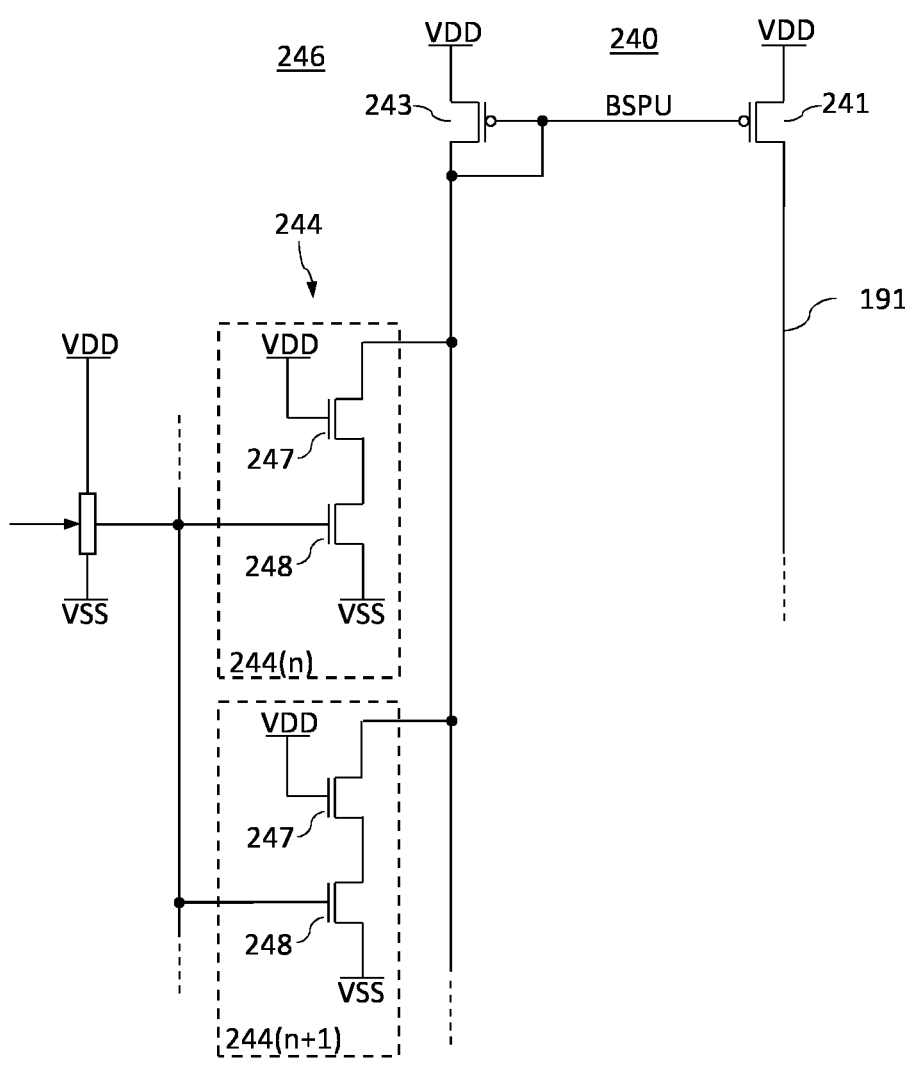
FIG. 5 shows a simplified circuit diagram of a current source circuit according to an embodiment having a complementary current source transistor and a mockup circuit.

In FIG. 5, the current source circuit 240 includes a bias voltage circuit 246 that passes a supply voltage dependent bias voltage to the gate of the current source transistor 241.

The combined leakage current through the output transistors 158 and the selection transistors 157 of all pixel circuits 100 connected to the same column signal line 191 impacts the signal level on the column signal line 191 with respect to a detector window of the comparator/latch circuit 210. The combined leakage current can strongly depend on the supply voltage, the temperature and/or variations in the manufacturing process.

The supply voltage dependent bias voltage circuit 246 compensates to some degree the effect of supply voltage fluctuations by adjusting the bias voltage applied to the gate of the current source transistor 241.

In particular, the supply voltage dependent bias voltage circuit 246 may include a current mirror circuit with the current source transistor 241 forming a first leg of the current mirror circuit between the positive second supply potential VDD and the column signal line 191, and with a complementary current source transistor 243 in a second leg of the current mirror circuit between the positive supply voltage VSS and a temperature-dependent mockup load, wherein gate and drain of the complementary current source transistor 243 are directly connected to each other.

FIG. 5 shows an example of a bias voltage circuit 246 that includes a complementary current source transistor 243 electrically connected between the second supply potential VDD and a mockup circuit 244, wherein the mockup circuit 244 emulates the plurality of parallel connections of the output transistor 158 and the selection transistor 157 electrically connected in series between the pixel output 159 and the first supply potential VSS, and wherein the gate of the current source transistor 241, a gate of the complementary current source transistor 243 and a node between a load path of the complementary current source transistor 243 and the mockup circuit 244 are electrically connected.

The mockup circuit 244 is designed such that the estimated leakage current through the mockup circuit 224 is equal to the combined estimated leakage current through all pixel circuits 100 connected to the same column signal line 191. The mockup circuit 244 may include one or more transistor pairs. Each transistor pair incudes a first transistor 248 and a second transistor 247, wherein the load paths of the first transistor 248 and the second transistor 247 are electrically connected in series between the column signal line 191 and the first supply potential VSS.

The combined first transistors 248 have the same configuration and electrical parameters as the combined output transistors 158 of the pixel circuits 100 connected to a column signal line 191. For example, each first transistor 248 may have the same channel length, dopant distributions, and gate configuration as the output transistors 158 and the combined channel width of all first transistors 248 is equal to the combined channel width of all output transistors 158.

The combined second transistors 247 have the same configuration and electrical parameters as the combined select transistors 157 of the pixel circuits 100 connected to a column signal line 191. For example, each second transistor 247 may have the same channel length, dopant distributions, and gate configuration as the select transistors 157 and the combined channel width of all second transistors 247 is equal to the combined channel width of all select transistors 158.

The gates of at least the second transistors 247, or both the first and the second transistors 248 are connected to a high potential, e.g., to the second supply potential VDD to turn the transistors on. In the illustrated embodiment, an intermediate potential between the second supply potential VDD and the first supply potential VSS is applied to the gates of the first transistors 248.

In the bias voltage circuit 246, the pull-up current for the column signal line 191 depends on temperature and supply voltage fluctuations in a similar way as the leakage current and can compensate to some degree temperature-dependent fluctuations and supply voltage dependent fluctuations of the voltage level of the event signal EV on the column signal line with respect to the detector window of the comparator/latch circuit 210.

Figure 6:
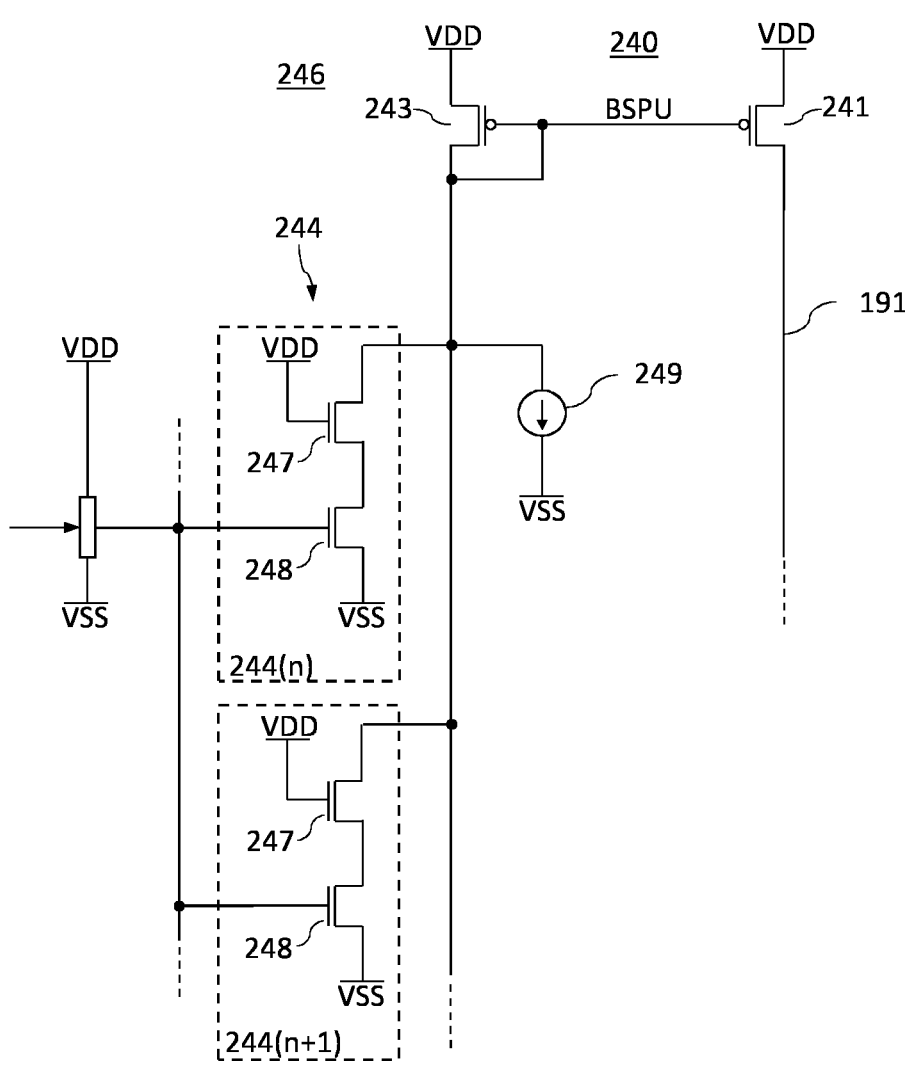
FIG. 6 shows a simplified circuit diagram of a current source circuit according to an embodiment having a complementary current source transistor, a mockup circuit, and a supplemental current source.

In FIG. 6, the bias voltage circuit 246 further includes a supplemental current source 249 electrically connected in parallel with the mockup circuit 244. The supplemental current source 249 ensures that a current in the through the complementary current source transistor 243 in the second leg of the current mirror does not fall below the preset minimum current given by the nominal current of the supplemental current source 249, and very small bias currents can be avoided.

The supplemental transistor 243 and the mockup circuit 244 may be shared between some or all pixel columns of a pixel array unit 10, wherein each pixel column includes one current source transistor 241. In particular, the supplemental transistor 243 and the mockup circuit 244 may be shared between some or all columns signal lines 191. For example, the pixel array unit 10 may include one supplemental transistor 243 and one mockup circuit 244 on two opposite sides of the pixel array unit 10, wherein each of the two supplemental transistors 243 is connected to one half of the column signal lines 191.

Figure 7A:
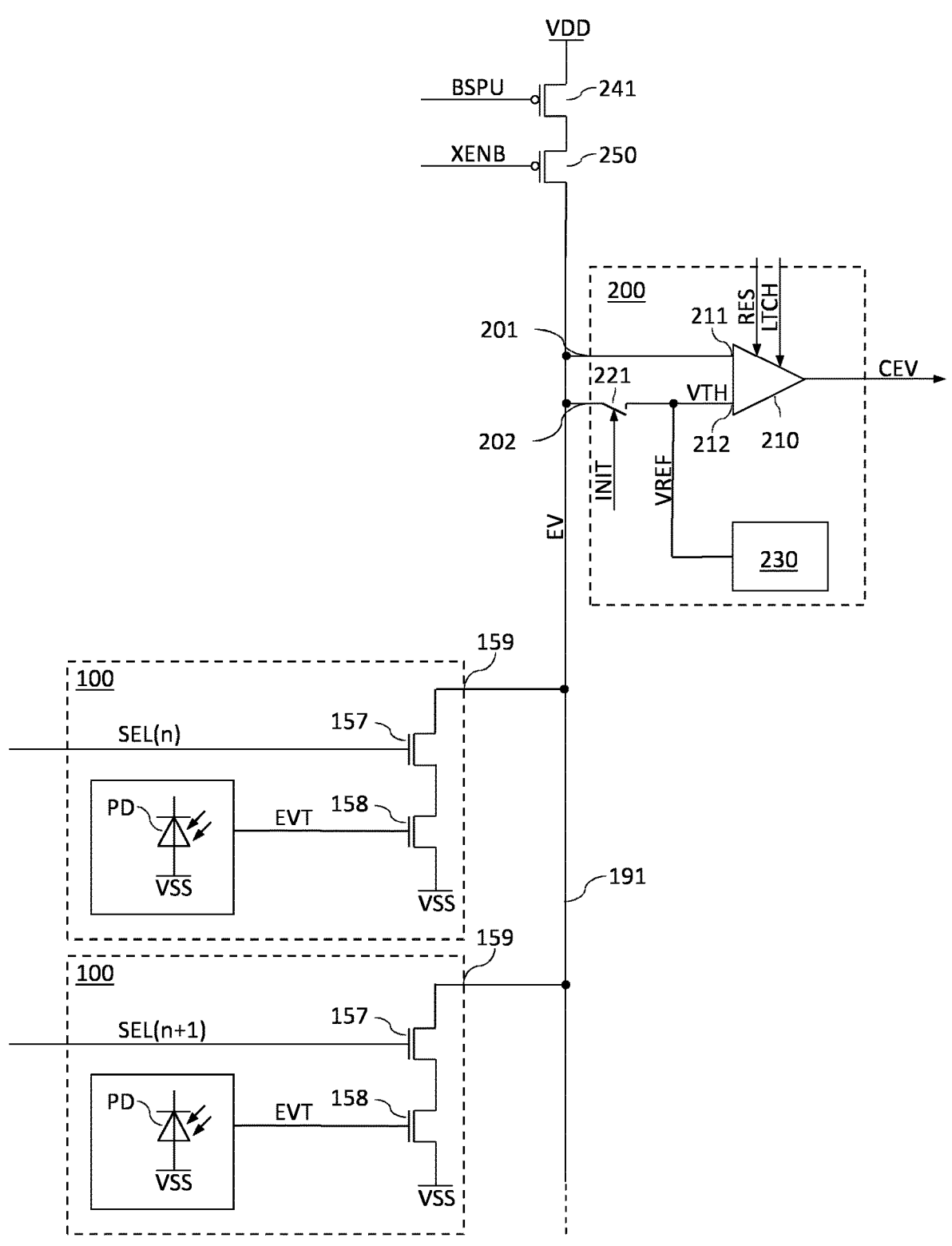
FIGS. 7A and 7B show a simplified circuit diagram of a portion of an image sensor according to an embodiment having a bias disabling circuit connected to the column signal line circuit, and a time diagram for internal signals of the image sensor.

In FIG. 7A, the image sensor further includes a bias disabling circuit 250 that disables biasing of the column signal line 191 in response to an active bias disable signal XENB.

The bias disabling circuit 250 may include an FET, e.g. a pFET. The bias disable signal XENB is applied to the gate of the FET. The bias disable signal XENB has an active voltage level and an inactive voltage level. The active bias disable signal XENB turns off the FET and disconnects the column signal line 191 from the current source circuit 240 to allow a precharge of the column signal line 191 with, e.g., the reference voltage VREF supplied by the reference voltage source 230 in an initialization period.

Figure 7B:
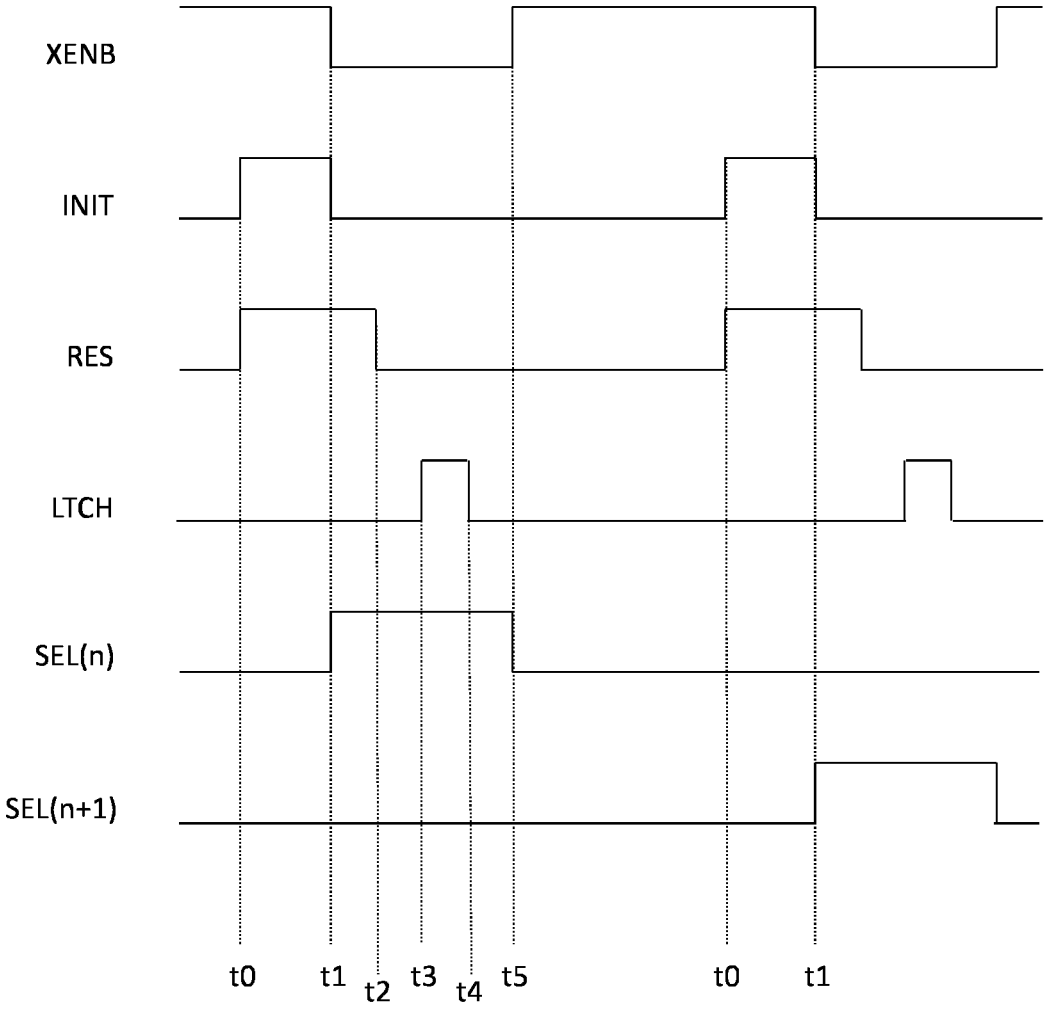

The controller 50 of FIG. 1 controls the bias disable signal XENB, the select signals SEL(n), SEL(n+1), . . . , the initialization signal INIT, the reset signal RES, and the latch signal LTCH as illustrated in FIG. 7B. Active voltage levels (active signals) are indicated by the high signal level ("1"). Inactive voltage levels (inactive signals) are indicated by the low signal level ("0").

The bias disable signal XENB is active from prior to t=t0 to t=t1, such that for the interval between t=t0 and t=t1, when the active initialization signal INIT turns on the first switch element 221, the FET of the bias disabling circuit 250 turns off and separates the column signal line 191 from the current source circuit 240 such that the potential on the column signal line 191 can be set to the reference voltage VREF.

At t=t1 the bias disable signal XENB becomes inactive. The FET of the bias disabling circuit 250 turns on and the current source circuit 240 becomes the load of an amplifier circuit with the output transistor 158 of the selected pixel circuit 100.

The bias disable signal XENB remains inactive at least until the column event signal has been latched, e.g. at least until t=t4. In the illustrated embodiment, the bias disable signal XENB is inactive for the complete pixel selection intervals t=t1 to t=t5, in which any of the select signals SEL(n), SEL(n+1), . . . is active. For the rest, the time diagram in FIG. 7B corresponds to the time diagram in FIG. 3B.

Figure 8A:
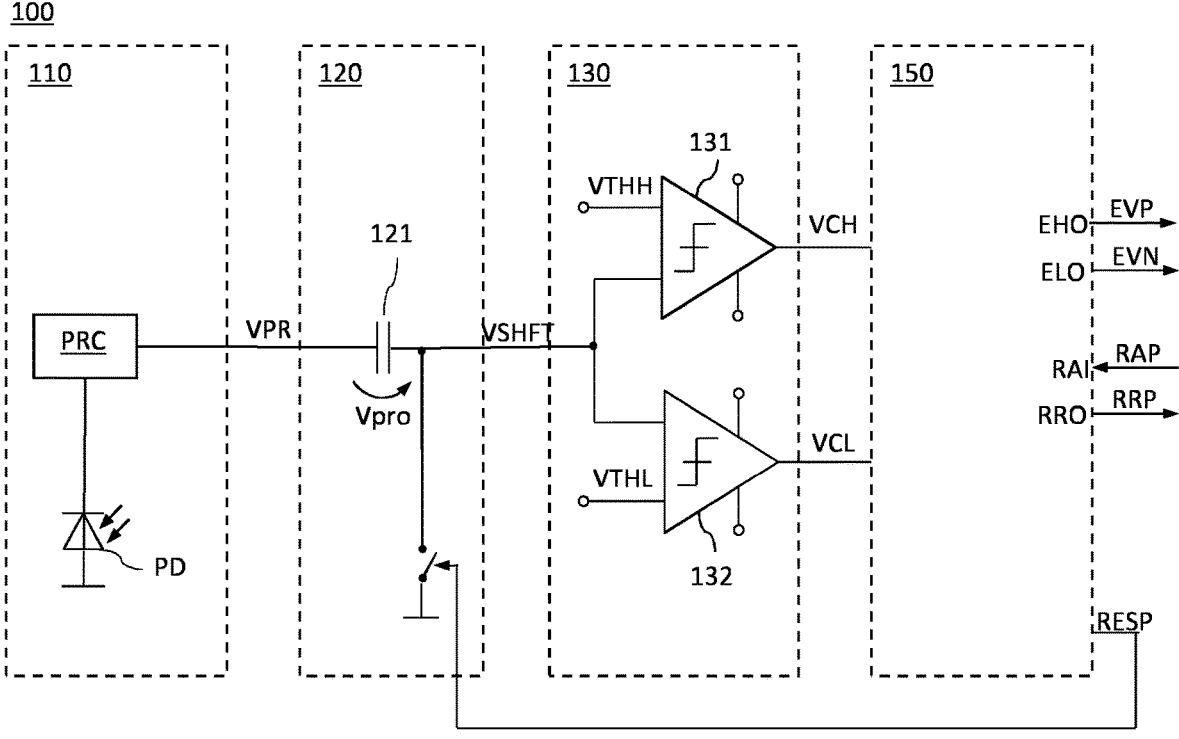
FIGS. 8A to 8C are simplified block diagrams of pixel circuits with photoreceptor modules and in-pixel communication circuits according to embodiments.
Figure 8B:
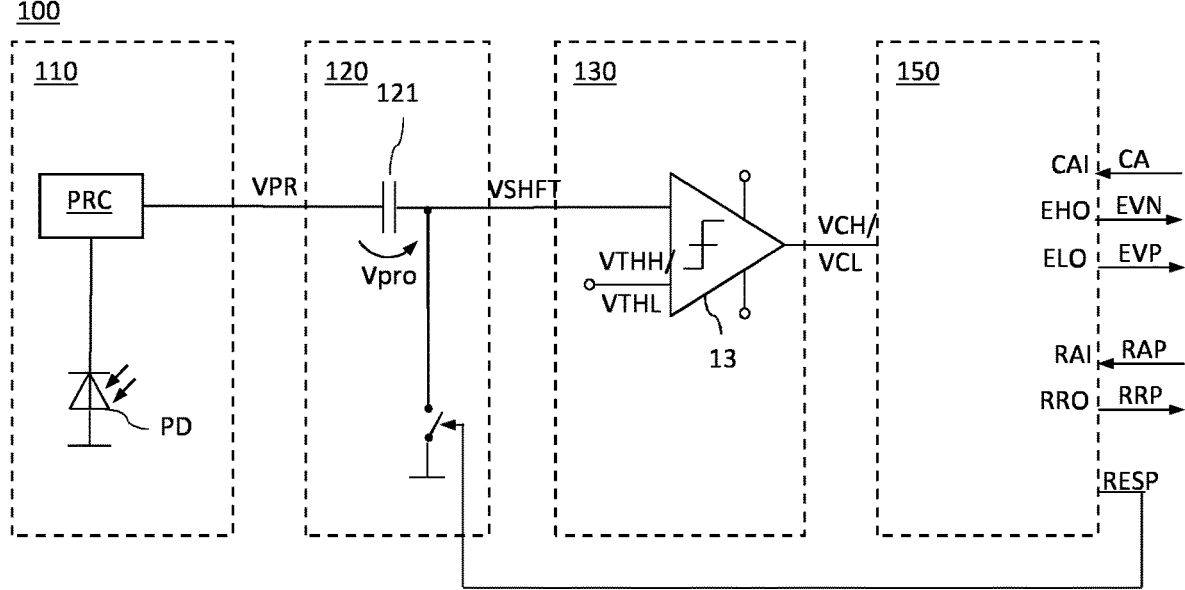
Figure 8C:
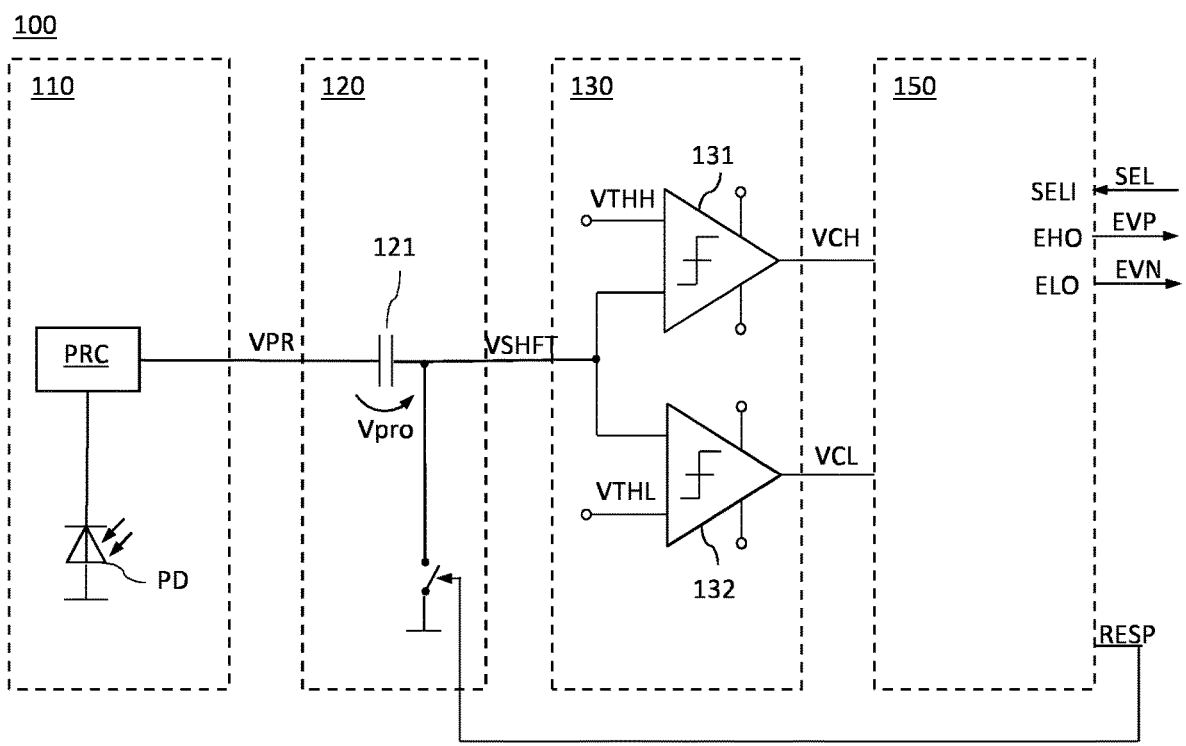

FIG. 8A to FIG. 8C illustrate various examples of pixel circuits 100 for event detection that can be combined with the comparator/latch circuit 210 as described above.

In each of FIG. 8A to FIG. 8C, the pixel circuit 100 includes a pixel photocurrent circuit 110 that outputs a pixel voltage signal VPR proportional to incoming light intensity, a voltage buffer 120 that generates a buffered pixel signal VSHF by shifting a voltage level of the pixel voltage signal VPR by an amount determined by a voltage level of the pixel voltage signal VPR at a reset time, and a pixel logic circuit 150 that outputs the pixel event signal EV based on a result of comparisons of the shifted pixel signal VSHF with a first reference voltage VTHH and a second reference voltage VTHL.

In particular, the pixel circuit 100 includes a photoreceptor module PR, a differencing stage DS, a comparator stage CS, and an in-pixel communication circuit CC.

The photoreceptor module PR includes a photoelectric conversion element PD and outputs a photoreceptor signal Vpr with a voltage level that depends on a detector current generated by the photoelectric conversion element PD.

The photoelectric conversion element PD may include or consist of a photodiode which by means of the photoelectric effect converts electromagnetic radiation incident on a detection surface into the detector current. The electromagnetic radiation may include visible light, infrared radiation and/or ultraviolet radiation. The amplitude of the detector current corresponds to the intensity of the incident electromagnetic radiation, wherein in the intensity range of interest the detector current increases approximately linearly with increasing intensity of the detected electromagnetic radiation.

The photoreceptor module PR may further include a photoreceptor circuit PRC that converts the detector current into a photoreceptor signal Vpr. The voltage of the photoreceptor signal Vpr is a function of the detector current, wherein in the voltage range of interest the voltage amplitude of the current photoreceptor signal Vpr increases with increasing detector current. For example, the voltage of the photoreceptor signal Vpr increases with the detector current logarithmically.

The differencing stage DS subtracts a previously evaluated photoreceptor voltage Vpro from the current photoreceptor signal Vpr to obtain a difference signal Vdiff representing a voltage difference between the previously evaluated photoreceptor voltage Vpro and the present voltage of the photoreceptor signal Vpr. For example, the differencing stage DS may include a sample capacitor 121 that is controlled to store a charge for a voltage drop across the sample capacitor 121 equal to the previously evaluated photoreceptor voltage Vpro.

The comparator stage CS compares the difference signal Vdiff with a lower threshold voltage VTHL and an upper threshold voltage VTHH.

In FIG. 8A the comparator stage CS includes two comparators 131, 132 for simultaneously comparing the difference signal Vdiff with the upper voltage threshold VTHH and with the lower voltage threshold VTHL.

Each comparator 131, 132 may output a digital comparator output signal VCL, VCH, e.g. a binary signal, wherein one of the voltage levels of the comparator output signals indicates that the difference signal Vdiff exceeds the corresponding threshold voltage and wherein another or the other voltage level of the comparator output signal indicates that the difference signal Vdiff does not exceed the corresponding threshold voltage. The comparator output signals represent the event data.

In FIG. 8B the comparator stage CS includes one single comparator 13 for successively comparing the difference signal Vdiff with the upper voltage threshold VTHH and with the lower voltage threshold VTHL. The comparator output signal VCHL contains the results of both comparisons sequentially.

The comparator output signals VCL, VCH, VCHL represent the event data, which may include a high event bit for the result of the comparison of the difference signal Vdiff with the upper voltage threshold VTHH and a low event bit for the result of the comparison of the difference signal Vdiff with the lower voltage threshold VTHL.

The in-pixel communication circuit CC may temporarily store the event data in the pixel circuit.

The in-pixel communication circuits CC in FIG. 8A and FIG. 8B are suitable for event-triggered readout. The in-pixel communication circuits CC may generate a row request signal RR in case an event has been detected and may output the row request signal RR at a row request output RRO. The row request output RRO may be an open collector output or any other output type allowing a plurality of pixel circuits 100 to be connected to the same row request line. The in-pixel communication circuit CC may further generate a low event signal EVL or a high event signal EVH in case an event has been detected.

In the illustrated embodiment, the in-pixel communication circuit CC includes a low event output ELO and a high event output EHO.

In case the difference signal Vdiff exceeds the upper voltage threshold VTHH, the in-pixel communication circuit CC may generate a high event signal EVH and outputs the high event signal EVH at the high event output EHO. In case the difference signal Vdiff falls below the lower voltage threshold VTHL, the in-pixel communication circuit CC may generate a low event signal EVL and outputs the low event signal EVL at the low event output ELO.

The in-pixel communication circuit CC may set the low or high event signal EVL, EVH active simultaneously with the row request signal RR, wherein the high event outputs EHO and the low event outputs ELO may be open collector outputs or may have any other output type allowing a plurality of pixel circuits 100 to be connected to the same event signaling line.

Alternatively, the in-pixel communication circuit CC may set the low or high event signal active only after being selected by the readout circuit 20-1, . . . , 20-n, wherein the event outputs EHO and low event outputs ELO may be push/pull outputs, by way of example.

The in-pixel communication circuit CC may further include a row acknowledgement input RAI for receiving a row acknowledge signal RA.

In the pixel circuit 100 of FIG. 8B, the in-pixel communication circuit CC may also include a column acknowledgement input CI for receiving a column acknowledge signal CA. According to other examples of the in-pixel communication circuit CC as illustrated in FIG. 2A, the column acknowledgement input CI is omitted and no column acknowledgement signals are passed to the pixel circuits 100.

The in-pixel communication circuit CC may reset an active row request signal RR in response to receiving an active row acknowledge signal RA. In addition, the in-pixel communication circuit CC may trigger an update of the previously evaluated photoreceptor voltage Vpro with the current photoreceptor voltage Vpr in the differencing section DS in response to receiving the row acknowledge signal RA.

The in-pixel communication circuit CC of FIG. 8B may reset the low and high event signals EVL, EVH in response to receiving a column acknowledge signal CA. In the absence of column acknowledgement signals CA and column acknowledgement inputs CI as it is the case in the pixel circuit 100 of FIG. 2A, the in-pixel communication circuit CC may reset the low and high event signals EVL, EVH in response to receiving the active row acknowledge signal RA.

If the in-pixel communication circuit CC includes a storage element holding the event data, the event data may be reset (cleared), in response to receiving the row acknowledge signal RA or in response to receiving the column acknowledge signal CA.

FIG. 8C refers to a pixel circuit 100 for readout at regular time intervals. The pixel circuits 100 are sequentially read out row-by-row. Each readout may trigger an update of the previously evaluated photoreceptor voltage Vpro with the current photoreceptor voltage Vpr in the differencing stage DS. In addition, each readout resets (clears) the event data.

Figure 9:
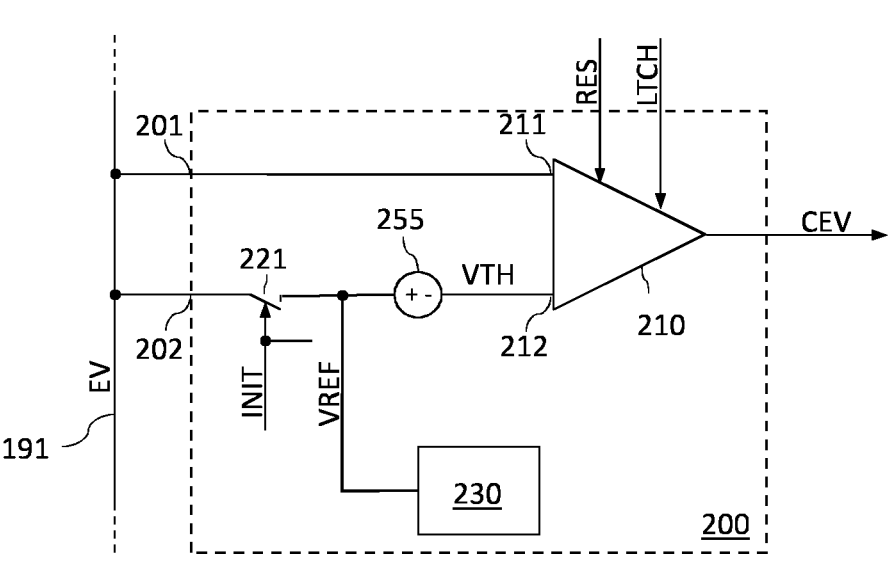
FIG. 9 shows a simplified block diagram of a column readout circuit according to an embodiment having a voltage bias element in a first input leg of the comparator/latch circuit.

In FIG. 9, the column readout circuit 200 includes a voltage bias element 255 that generates a voltage bias at one of the first comparator input 211 and the second comparator input 212. In the illustrated embodiment, the voltage bias element 255 is effective between an output of the reference voltage source 230 and the first switch element 221 at one side and the second comparator input 212 at the other side.

In the previous embodiments, the bias current imprinted by the current source transistor 241 on the column signal line 191 may be smaller than the maximum combined leakage current through the pixel circuits 100 due to a mismatch in fabrication. The voltage bias element 255 may mitigate this condition to some degree by adding a controllable margin by which the column signal line 191 has to change at least.

The voltage bias element 255 may be realized as systematic offset at the second comparator input. For example, the comparator/latch circuit 210 may include a first input transistor receiving the signal applied to the first comparator input 211 and a second input transistor receiving the signal applied to the second comparator input 212, and one of the input transistors differs by design from the other transistor, e.g., has a larger channel width. Alternatively, the voltage bias element 255 includes a portion of a resistor ladder electrically connected between a high reference potential and a low reference potential, wherein the reference voltage VREF and the voltage directly applied to the second comparator input 212 are tapped at different nodes of the resistor ladder. In this embodiment, the threshold voltage VTH differs from the reference voltage VREF.

Figure 10:
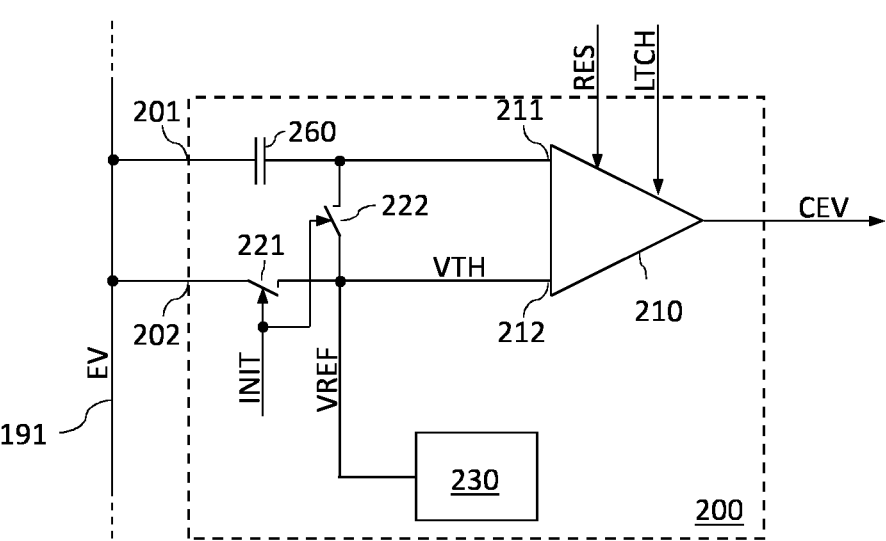
FIG. 10 shows a simplified block diagram of a column readout circuit according to an embodiment having a capacitive element in a second input leg of the comparator/latch circuit.

FIG. 10 shows a column readout circuit 200 that includes a first switch element 221 that electrically couples the column signal line 191 and the second comparator input 212 via a low impedance path in response to an active initialization signal INIT. A capacitive element 260 couples the pixel event signal EV to the first comparator input 211. A second switch element 222 electrically couples the first comparator input 211 and the second comparator input 212 via a low impedance path in response to the initialization signal INIT.

The controller 50 of FIG. 1 controls the bias disable signal XENB, the select signals SEL(n), SEL(n+1), . . . , the initialization signal INIT, the reset signal RES, and the latch signal LTCH as illustrated in FIG. 7B.

In the initialization phase between t=t0 and t=t1, the potential at the first comparator input is initialized with the reference voltage VREF. After t=t1 the first comparator input 211 floats and the comparator/latch circuit 210 senses not more than whether the potential on the column signal line 191 rises of falls. The circuit detects events correctly provided that the bias current induced by the current source transistor 241 on the column signal line 191 is larger than the combined leakage current through the pixel circuits 100, but lower than an active pull-down current driven by the output transistor 158 of the selected pixel circuit.

Figure 11:
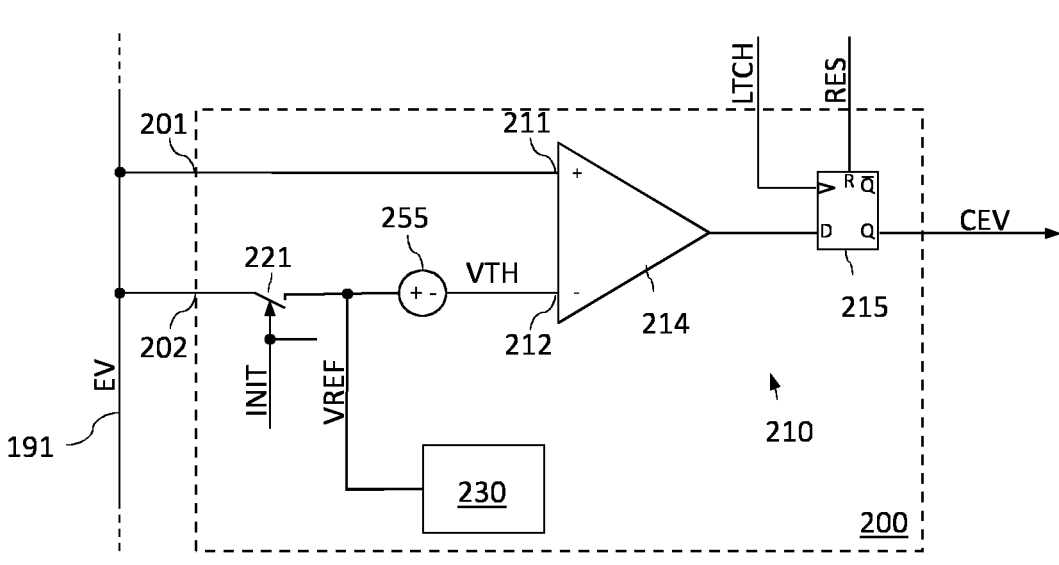
FIG. 11 shows a simplified block diagram of a column readout circuit according to an embodiment having a latch circuit in an output leg of the comparator/latch circuit.

In FIG. 11, the comparator/latch circuit 210 of FIG. 9 includes a comparator circuit 214 and a latch circuit 215, wherein the latch circuit 215 is configured to latch a comparator output signal of the comparator circuit 214 in response to a trailing and/or falling edge of a latch signal LTCH.

The latch circuit 215 may be a latch similar to a D flip-flop, wherein the output signal of the comparator circuit 214 is passed to the data input D of the latch circuit 215, the latch signal LTCH is passed to the clock input, the reset signal RES is passed to the reset input R and wherein the column event signal CEV is output at the Q output of the latch circuit 215.

Figure 12:
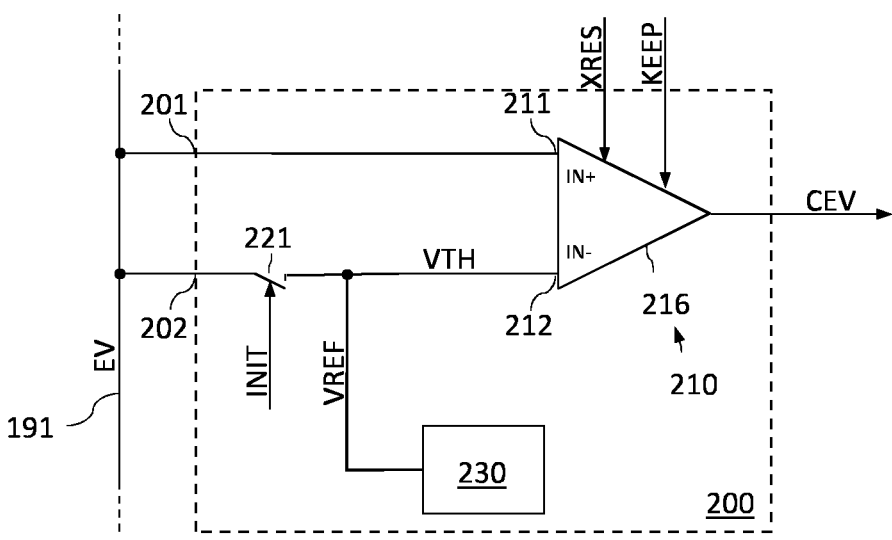
FIG. 12 shows s a simplified block diagram of a column readout circuit according to an embodiment having a comparator/latch circuit with integrated latch comparator.

FIG. 12 shows a column readout circuit 200 in which the comparator/latch circuit 210 of FIG. 7A includes a latch comparator 216 that integrates the functions of comparing and latching and that latches the result of the comparison with one of the edges of the inverted reset signal XRES which is the inverted of the reset signal RES in FIG. 7B. Keep transistors activated by an active keep signal KEEP may be used to avoid that the latched result is lost due to leakage current from transistors that hold the result of the comparison. The keep transistors may be omitted, when the result of the comparison has to be stored for only a short time in the latch comparator 216, for example, when the result of the comparison is passed to a memory element such as the D flip-flop of FIG. 11.

Figure 13:
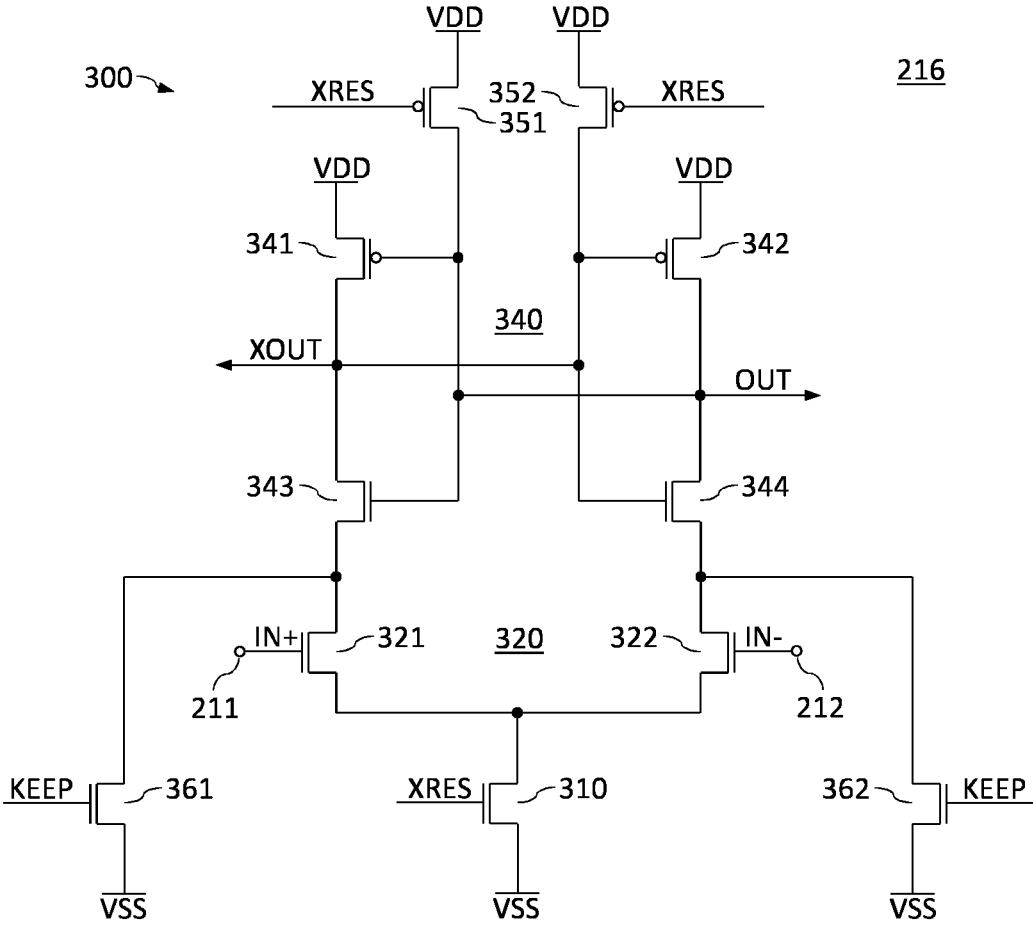
FIG. 13 shows a circuit diagram of the latch comparator for the comparator/latch circuit of FIG. 12 according to an embodiment.

The comparator/latch circuit shown in FIG. 13 includes a latch comparator 216 that includes a tail transistor 310 and a differential pair 320, wherein the differential pair 320 comprises a first input transistor 321 and a second input transistor 322, wherein the first comparator input 211 is connected to a gate of the first input transistor 321, wherein the second comparator input 212 is connected to a gate of the second input transistor 322, and wherein load paths of the differential pair 320 are connected in parallel to each other between a hold circuit 340 and a load path of the tail transistor 310 in the trail portion.

The first and second input transistors 321, 322 are matching transistors with the same design parameters and are nFETs for the illustrated embodiment. An active inverted reset signal XRES turns on the tail transistor 310 and sets the sources of the first and second input transistors 321, 322 to the low supply potential VSS. The hold circuit 340 includes a first leg between the high supply voltage VDD and the drain of the first input transistor 321, and a second leg between the high supply voltage VDD and the drain of the second input transistor 322.

The first leg includes a first pFET 341 and a first nFET 343 electrically connected in this order in series between the high supply voltage VDD and the drain of the first input transistor 321. A first internal gate line connects the gates of the first pFET 341 and the first nFET 343. A load path of a first reset FET 351 is connected between the high supply potential VDD and the first internal gate line. The first reset FET 351 is a pFET. The active inverted reset signal XRES turns on the first reset FET 351 and sets the first internal gate line to the potential of the high supply potential VDD.

The second leg includes a second pFET 342 and a second nFET 344 electrically connected in this order in series between the high supply voltage VDD and the drain of the second input transistor 322. A second internal gate line connects the gates of the second pFET 342 and the second nFET 344. A load path of a second reset FET 352 is connected between the high supply potential VDD and the second internal gate line. The second reset FET 352 is a pFET. The active inverted reset signal XRES turns on the second reset FET 352 and sets the second internal gate line to the potential of the high supply potential VDD.

The first gate signal line is electrically connected to a first output node between the second pFET 342 and the second nFET 344. The first output node outputs the non-inverted output signal OUT. The second gate signal line is electrically connected to a second output node between the first pFET 341 and the first nFET 343. The second output node outputs the inverted output signal XOUT.

A load path of a first keep nFET 361 is electrically connected between the drain of the first input transistor 321 and the negative supply potential VSS. A load path of a second keep nFET 362 is electrically connected between the drain of the second input transistor 322 and the negative supply potential VSS. A keep signal KEEP is applied to the gates of the first keep nFET 361 and the second keep nFET 362. An active KEEP signal effects that the latched status of the hold circuit 340 is kept even when the inverted reset signal XRES is inactive and thus there is no active connection between the source of the first nFET 343 and the source of the second nFET 344 on the one hand, and the low supply potential VSS on the other hand. In addition, once the KEEP signal becomes active, the first and second keep nFETs 361, 362 decouple the outputs of the latch comparator 216 from the inputs and make the output signals less sensitive to noise or unwanted signals on the inputs.

Figure 14:
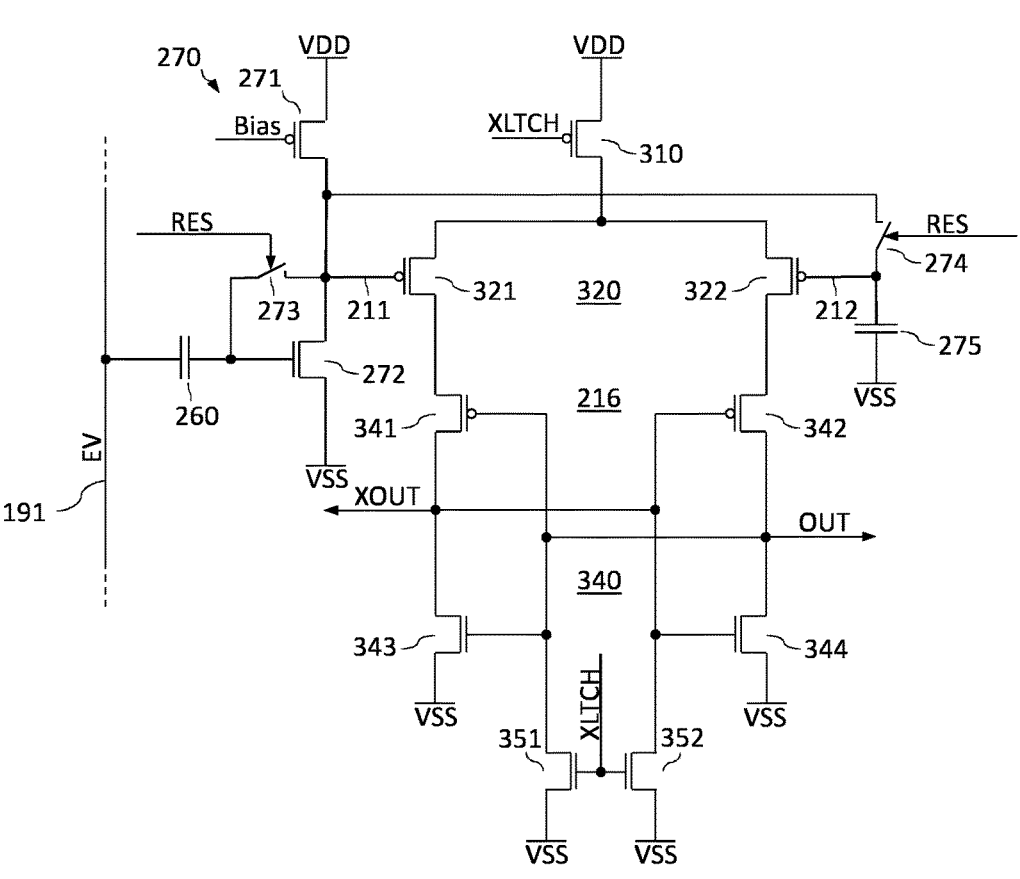
FIG. 14 shows a simplified circuit diagram of a column readout circuit according to an embodiment including a preamplifier circuit and another latch comparator.

FIG. 14 shows a portion of a column readout circuit including a latch comparator 216 combined with a pre-amplifier circuit 270.

In particular, the image sensor may include, in addition to a latch comparator 216, a capacitive element 260 and a preamplifier circuit 270, wherein the capacitive element 260 passes the pixel event signal EV to an input of the pream-plifier circuit 270, and wherein the preamplifier circuit 270 amplifies the pixel event signal EV passed to the input of the preamplifier circuit 270 and supplies an amplified pixel event signal to the first comparator input 211 or the second comparator input 212.

The preamplifier circuit 270 may further electrically connect the first comparator input 211, the second comparator input 212 and the input of the preamplifier circuit 270 in response to an active reset signal RES. In this way, the comparator creates its own comparison reference by sampling the output signal of the preamplifier circuit 270 during the active reset signal RES.

The controller 50 of FIG. 1 controls the select signals SEL(n), SEL(n+1), . . . , the initialization signal INIT, the reset signal RES, the inverted latch signal XLTCH, and, if applicable, the bias disable signal XENB in the way as illustrated in FIG. 7B, wherein the inverted latch signal XLTCH is the inverted signal to the latch signal LTCH shown in FIG. 7B.

The latch comparator 216 in FIG. 14 is complementary to the latch comparator 216 in FIG. 13. In particular, the first and second input transistors 321, 322 and the tail transistor 310 are pFETs, wherein the load path of the tail transistor 310 is electrically connected between the high supply potential VDD and the drains of the first and second input transistors 321, 322.

The first leg of the hold circuit 340 includes a first pFET 341 and a first nFET 343 electrically connected in this order in series between the source of the first input transistor 321 and the low supply voltage VSS. A first internal gate line connects the gates of the first pFET 341 and the first nFET 343. A load path of a first reset FET 351 is connected between the first internal gate line and the low supply potential VSS.

The second leg of the hold circuit 340 includes a second pFET 342 and a second nFET 344 electrically connected in this order in series between the source of the second input transistor 322 and the low supply voltage VSS. A second internal gate line connects the gates of the second pFET 342 and the second nFET 344. A load path of the second reset FET 352 is connected between the second internal gate line and the low supply potential VSS.

The first and second reset FETs 351, 352 are nFETs. An active inverted latch signal XLTCH turns on the first and second reset FETs 351, 352 and sets the first and second internal gate line to the potential of the low supply potential VSS.

The first gate signal line is electrically connected to a first output node between the second pFET 342 and the second nFET 344. The first output node outputs the non-inverted output signal OUT. The second gate signal line is electrically connected to a second output node between the first pFET 341 and the first nFET 343. The second output node outputs the inverted output signal XOUT.

The preamplifier circuit 270 includes an amplifier transistor 272 and an amplifier load 271, wherein the amplifier load 271 and a load path of the amplifier transistor 272 are electrically connected in this order in series between the high supply potential VDD and the low supply potential VSS. The amplifier load 271 may include a pFET with fixed gate bias Bias.

The capacitive element 260 couples the pixel event signal EV to an input of the preamplifier circuit 270, wherein in the illustrated embodiment the input of the preamplifier circuit 270 is the gate of the amplifier transistor 272. The output of the preamplifier circuit 270 between the amplifier load 271 and the drain of the amplifier transistor 272 is connected to the gate of the first input transistor 321.

A first reset switch element 273 is connected between the input and the output of the preamplifier circuit 270. A second reset switch element 274 is connected between the output of the preamplifier circuit 270 and the gate of the second input transistor 322 of the latch comparator 216. An active reset signal RES turns on the first and second reset switch elements 273, 274 to sample the output signal of the preamplifier circuit 270 at the second comparator input 212 in the reset period.

Figure 15:
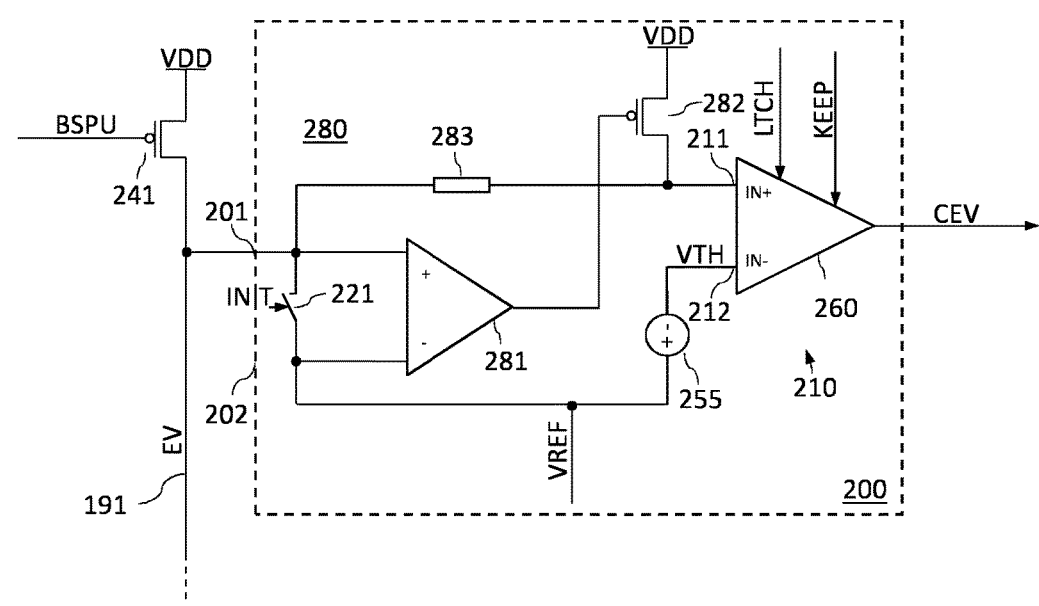
FIG. 15 shows a simplified circuit diagram of a column readout circuit having a transimpedance amplifier circuit and a comparator/latch circuit latch according to an embodiment.

FIG. 15 concerns an image sensor with a column readout circuit 200 that includes a transimpedance amplifier circuit 280. The transimpedance amplifier circuit 280 includes an operational amplifier 281, wherein the operational amplifier 281 receives the pixel event signal EV at one of a non-inverting input and an inverting input, and a reference voltage VREF at another one of the non-inverting input and the inverting input. The transimpedance amplifier circuit 280 passes a signal derived from an output signal of the operational amplifier 281 to the first comparator input 211 of the comparator/latch circuit 210.

In addition, the transimpedance amplifier circuit 280 includes a feedback path to the non-inverting input of the operational amplifier 281 in case that the feedback path provides feedback signal inversion, or to the inverting input in case the feedback path does not provide signal inversion. Through the feedback path, the operational amplifier 281 keeps the voltage at its input connected to the feedback path constant. As a result, the potential on the column signal line 191 remains constant. The pixel event signal EV can be evaluated by analyzing the current required to keep the potential on the columns signal line 191 constant. The transimpedance amplifier circuit 280 reduces the impact of the parasitic capacitance of the column signal line 191 on the evaluation of the active pixel event signal EV.

To this purpose, the transimpedance amplifier circuit 280 may further include a feedback transistor 282 and a feedback resistor 283. The feedback transistor 282 is a pFET with a load path connected between the high supply potential VDD and the first input of a latch comparator 260. The feedback transistor 282 is inverting and provides a negative feedback to the non-inverting input of the operational amplifier 281. The non-inverting input of the operations amplifier 281 is connected to the column signal line 191. The reference voltage VREF is applied to the inverting input of the operational amplifier 281. An output signal of the opera-tional amplifier 281 is passed to the gate of the feedback transistor 282. The feedback resistor 283 is connected between the source of the feedback transistor 282 and the non-inverting input of the operational amplifier 281.

In an alternative implementation, the output signal of the operational amplifier 281 is directly connected to a first side of the feedback resistor 283 and the first comparator input 211. Then the reference voltage VREF is connected to the non-inverting input of the operational amplifier 281, and the column signal line 191 and the second side of the feedback resistor 283 are connected to the inverting input of the operational amplifier 281, A voltage bias element 255 is connected between the reference voltage VREF and the second comparator input 212. A first switch element 221 may be electrically con-nected between the two inputs of the operational amplifier 281. An active initialization signal INIT turns on the first switch element 221 and sets the column signal line 191 to a defined potential. If a current source transistor 241 is used as described with reference to FIG. 3A, the bias current deliv-ered by the current source transistor 241 is designed to be lower than the current drawn by the selected pixel circuit 100 outputting an active pixel event signal EV.

The controller 50 of FIG. 1 controls the select signals SEL(n), SEL(n+1), . . . , the reset signal RES, the latch signal LTCH, and, if applicable, the bias disable signal XENB such that first the potential on the column signal line 191 and the latch comparator are reset. Then a pixel circuit 100 is selected and after a predetermined time the comparator output signal is latched.

FIG. 16 to FIG. 20 refer to column readout circuits 20 for differential readout. The differential readout is based on that each pixel column includes two column signal lines 191, 192, and on that the pixel circuits 100 output the pixel event signals EV on one of the column signal lines and inverted pixel event signals XEV on the other one of the column signal lines.

As in the previous embodiments, the image sensor includes a plurality of pixel circuits 100 for event detection, wherein each pixel circuit 100 includes an output transistor 158 and a selection transistor 157 electrically connected in series between a pixel output 159 and a first supply potential VSS. A column signal line 191 electrically connects the pixel outputs 159 of the plurality of pixel circuits 100. A comparator/latch circuit 210 receives a signal derived from a pixel event signal EV transmitted on the column signal line 191 at a first comparator input 211.

For differential readout, each pixel circuit 100 further includes a complementary output transistor 168 and a complementary selection transistor 167 electrically con-nected in series between a complementary pixel output 169 and the first supply potential VSS. The image sensor further includes a complementary column signal line 192 electri-cally connecting the complementary pixel outputs 169 of the plurality of pixel circuits 100. The comparator/latch circuit 210 receives a signal derived from a complementary pixel event signal XEV transmitted on the complementary column signal line 192 at the second comparator input 212.

The comparator/latch circuit 210 outputs a latched active column event signal CEV, when the signal at the first comparator input 211 exceeds or falls below the signal at the second comparator input 212.

The controller 50 of FIG. 1 controls the select signals SEL(n), SEL(n+1), . . . , the reset signal RES, and the latch signal LTCH such that first the potential on the column signal line 191 and the comparator/latch circuit 210 are reset. An active select signal SEL(n) selects one of the pixel circuits 100 of a pixel column. The potential on one of the column signal line 191 and the complementary column signal line 192 decreases by the leakage current through the unselected pixels. The potential on the other one of the column signal line 191 and the complementary column signal line 192 decreases due to an active pull-down by the selected pixel circuit 100. The output signal of the compara-tor/latch circuit 210 indicates which of the two signals was actively driven to low potential. After a minimum settle time, the output signal of the comparator/latch circuit 210 is latched. The latched output signal gives the column event signal CEV.

Other than the previous embodiments, the differential readout gets along without pull-up bias current for matching leakage currents through the pixel circuits 100.

Instead, the image sensor includes a reset circuit 280 that electrically connects the column signal line 191 and the complementary column signal line 192 with a fixed potential in response to an active reset signal RES.

Figure 16:
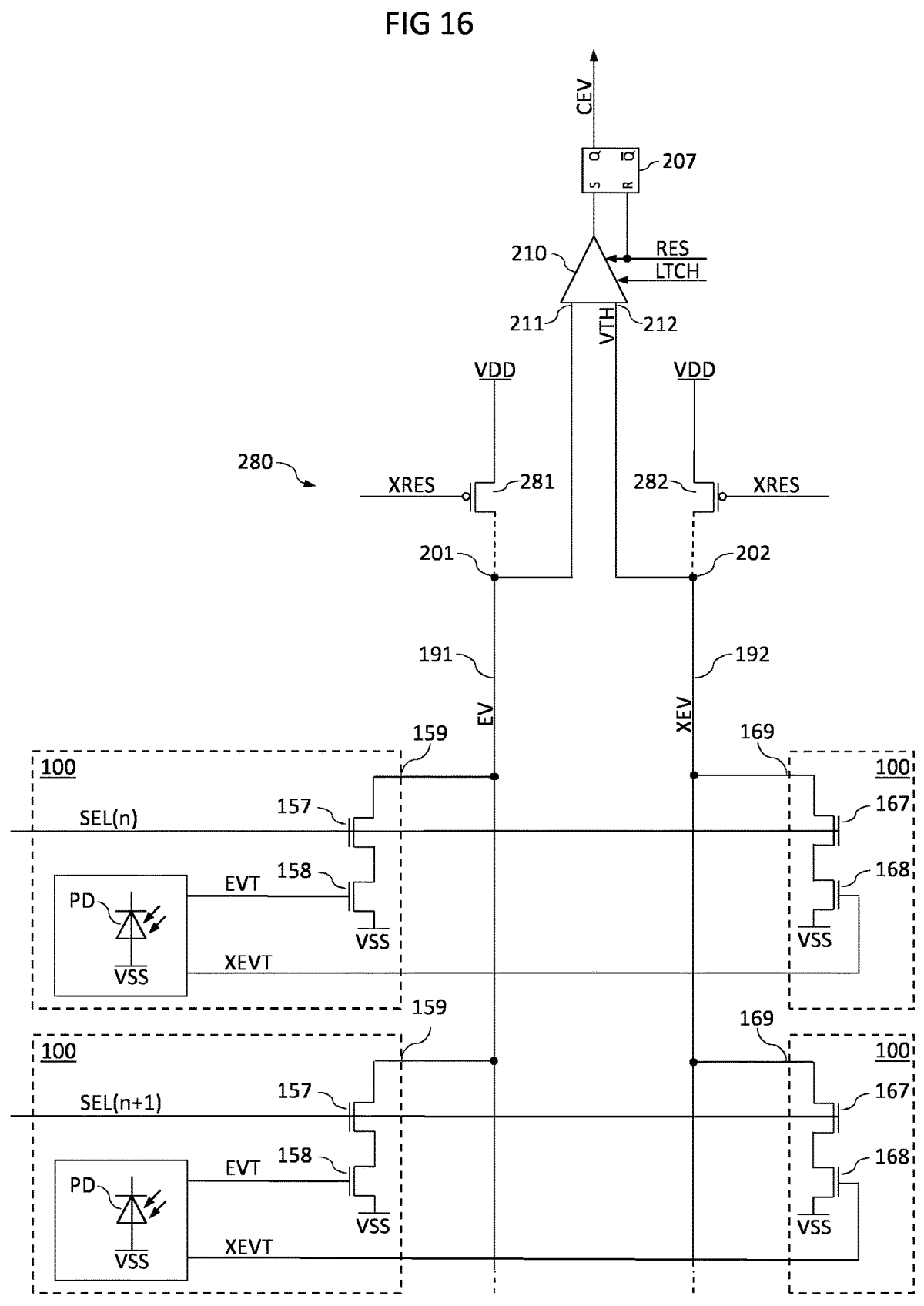

In FIG. 16, the reset circuit 280 includes a first signal line reset FET 281 between the high supply potential VDD and the column signal line 191, and a second signal line reset FET 282 between the high supply potential VDD and the complementary column signal line 192. The first and second signal line reset FETS 281, 282 are pFETs. An active inverted reset signal XRES turns on the first and second signal line reset FETS 281, 282 and sets the potential on the column signal line 191, and the complementary signal line 192 to the high supply potential VDD.

The column signal line 191 and the first comparator input 211 are electrically connected and the complementary col-umn signal line 192 and the second comparator input 212 are electrically connected.

A set input S of an additional latch circuit 207 receives the output signal of the comparator latch circuit 210 and the additional latch circuit 215 outputs the latched signal on a Q output. An active reset signal RES resets both the compara-tor/latch circuit 210 and the additional latch circuit 207 through the reset input R The latch circuit 215 may be a latch similar to a D flip-flop, wherein the output signal of the comparator circuit 214 is passed to the data input D of the latch circuit 215, the latch signal LTCH is passed to the clock input, the reset signal RES is passed to the reset input R and wherein the column event signal CEV is output at the Q output of the latch circuit 215.

Figure 17:
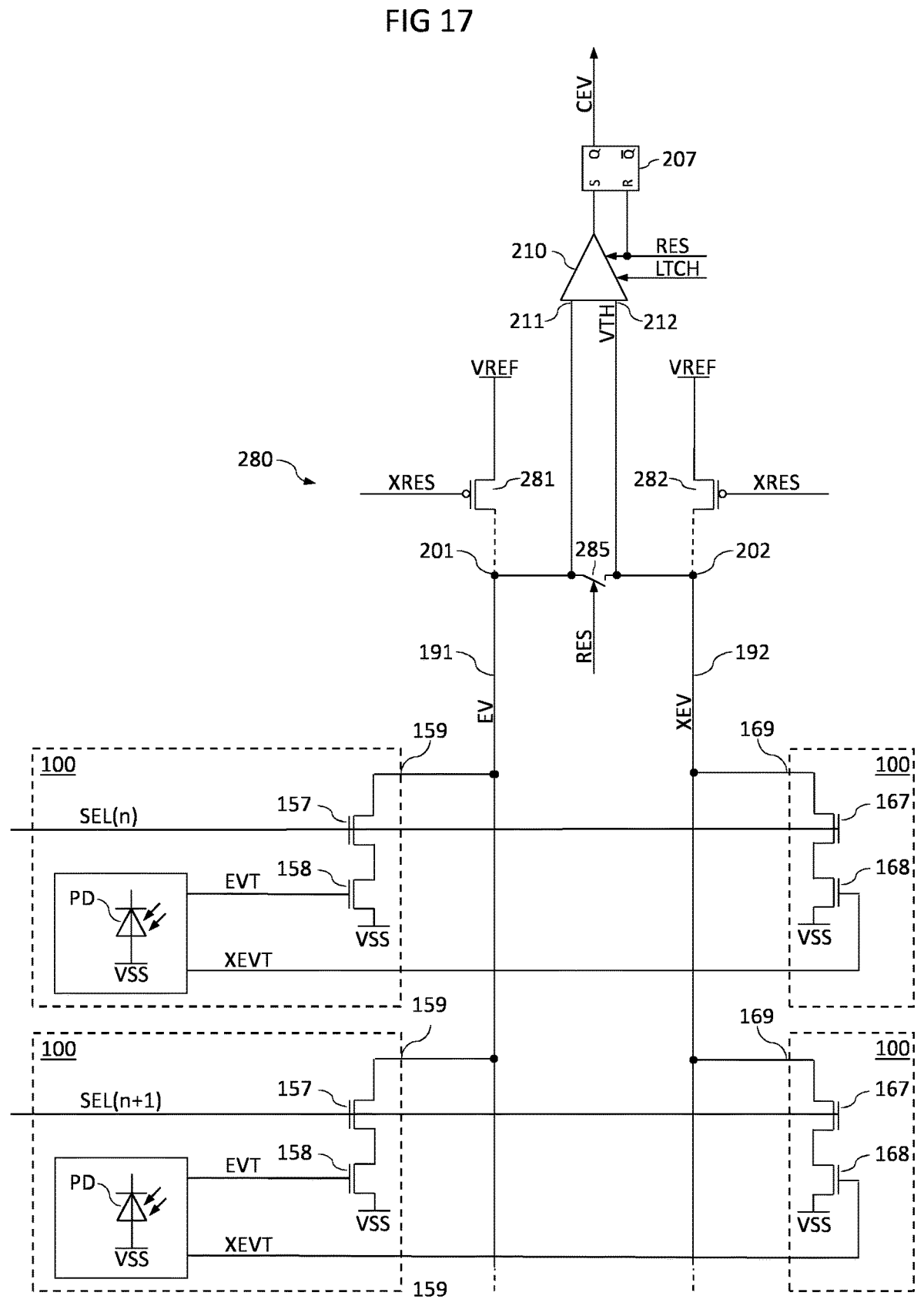

In FIG. 17, the image sensor includes one or more supplementary switch elements 285 that directly connect the column signal line 191 and the complementary column signal line 192 in response to an active reset signal RES. Each supplementary switch 285 may be physically located close to and between the column signal line 191 and the complementary column signal line 192, e.g. within the pixel array unit 11. Shorting the column signal line 191 and the complementary column signal line 192 during a reset interval equals the potentials on the column signal line 191 and the complementary column signal line 192, even if the column signal line 191 and the complementary column signal line 192 do not reach completely the reference potential VREF within the expected time.

The reset circuit 280 includes a first signal line reset FET 281 between a reference potential VREF and the column signal line 191, and a second signal line reset FET 282 between the reference potential VREF and the complementary column signal line 192. When the active inverted reset signal XRES turns on the first and second signal line reset FETS 281, 282, the potential on the column signal line 191, and the complementary signal line 192 are set to the reference potential VREF, which may be significantly lower than the high supply potential VDD. Resetting the potential on the column signal line 191 and the complementary column signal line 192 to the reference voltage VREF instead of the high supply voltage VDD, reduces the voltage swing on the column signal line 191 and the complementary column signal line 192.

Figure 18:
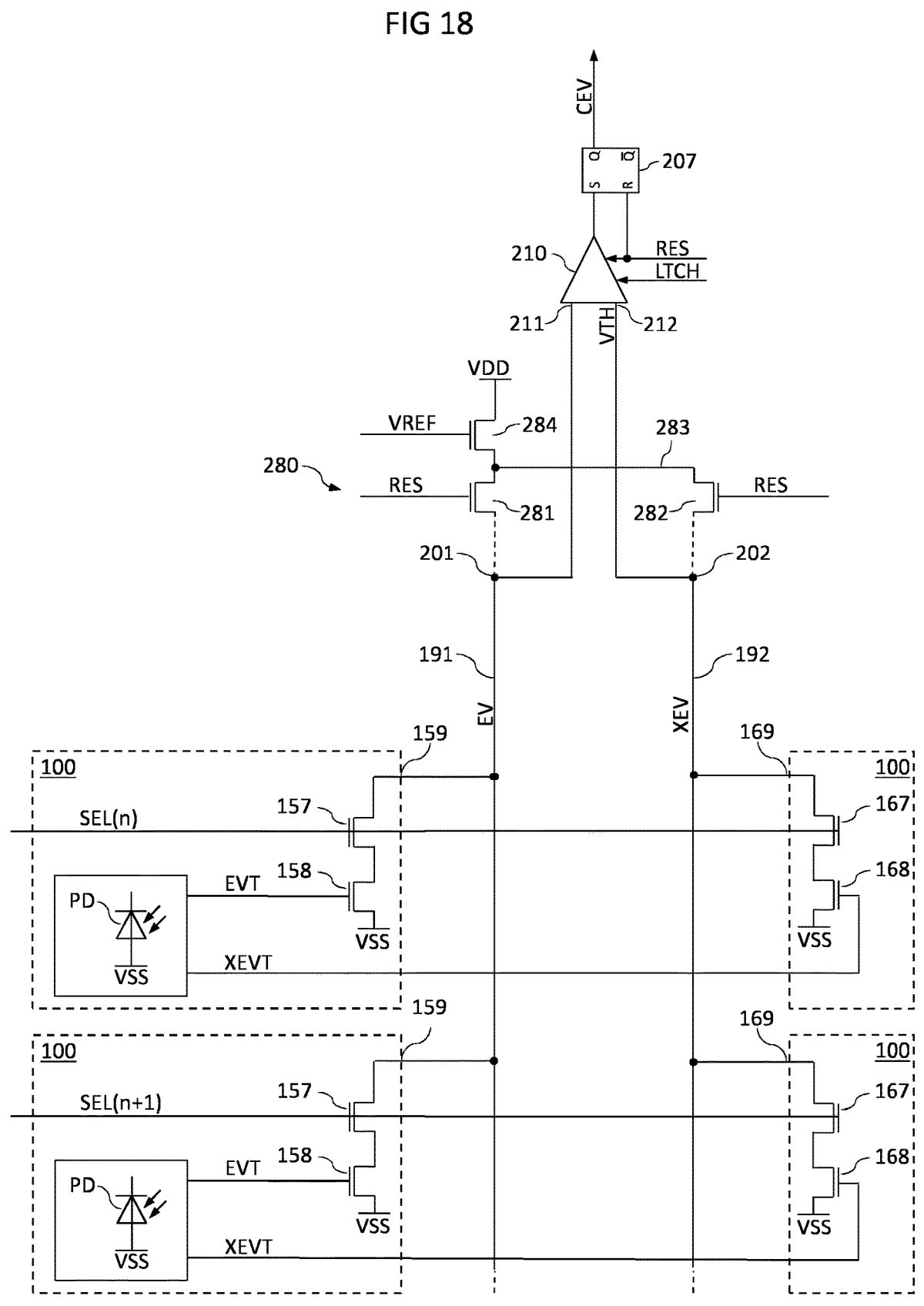

FIG. 18 shows a reset circuit 280 that includes a first line reset transistor 281 with a load path connected between a reset node 283 and the column signal line 191, a second line reset transistor 282 with a load path connected between the reset node 283 and the complementary column signal line 192, and a pull-up transistor 284 between the reset node 283 and the high supply potential VDD.

A gate of the pull-up transistor 284 is biased with a constant reference voltage VREF. The first line reset transistor 281, the second line reset transistor 282 and the pull-up transistor 284 are nFETs. The column signal line 191 and the complementary column signal line 192 are reset to one gate threshold voltage below the reference voltage VREF.

Figure 19:
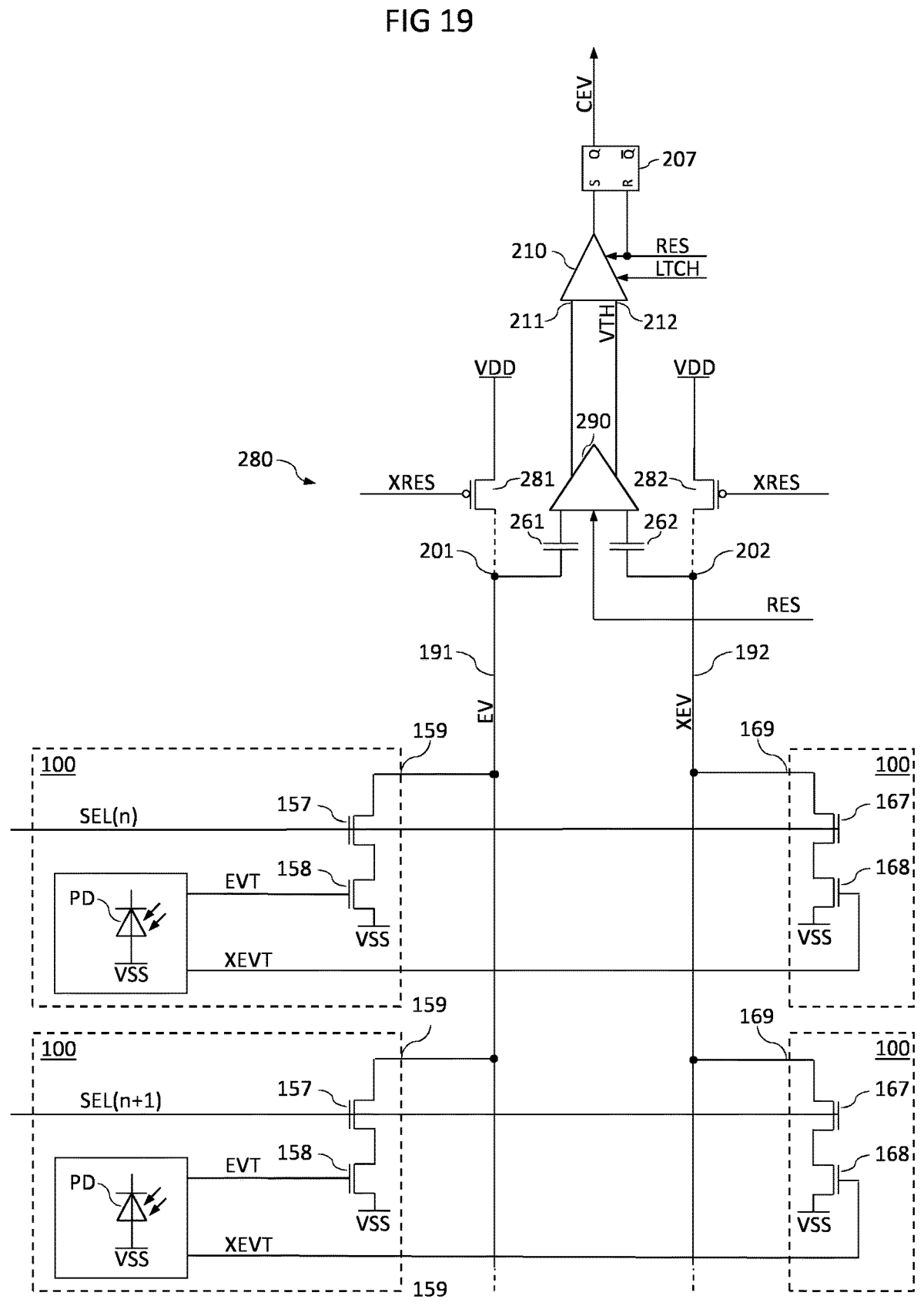

FIG. 19 shows a column readout circuit for differential readout with capacitively coupled differential preamplifier as input stage.

In particular, the column readout circuit includes a differential amplifier circuit 290 that outputs a differential output signal between a first amplifier output and a second amplifier output in response to a voltage difference between a first amplifier input and a second amplifier input, wherein the comparator/latch circuit 210 is configured to receive the differential output signal between the first comparator input 211 and the second comparator input 212. A first input capacitor 261 passes the pixel event signal EV to the first amplifier input; and a second input capacitor 262 passes the complementary pixel event signal XEV to the second amplifier input.

An active reset signal RES may reset the differential amplifier circuit 290, e.g., by directly connecting the input and the output of a first preamplifier stage in a first input leg of the differential amplifier circuit 290, and by directly connecting the input and the output of a second preamplifier stage in a second input leg of the differential amplifier circuit 290, in response to an active reset signal RES.

With the capacitively coupled preamplifier in the input legs, the output signal of the latch comparator 216 indicates on which of the column signal line 191 and the complementary column signal line 192 the potential changes to a higher degree. The DC voltage levels on the column signal line 191 and the complementary column signal line 192 are less relevant such that even when the column signal line 191 and the complementary column signal line 192 reset to different potentials, the correct pixel event signal is reliably detected.

Figure 20:
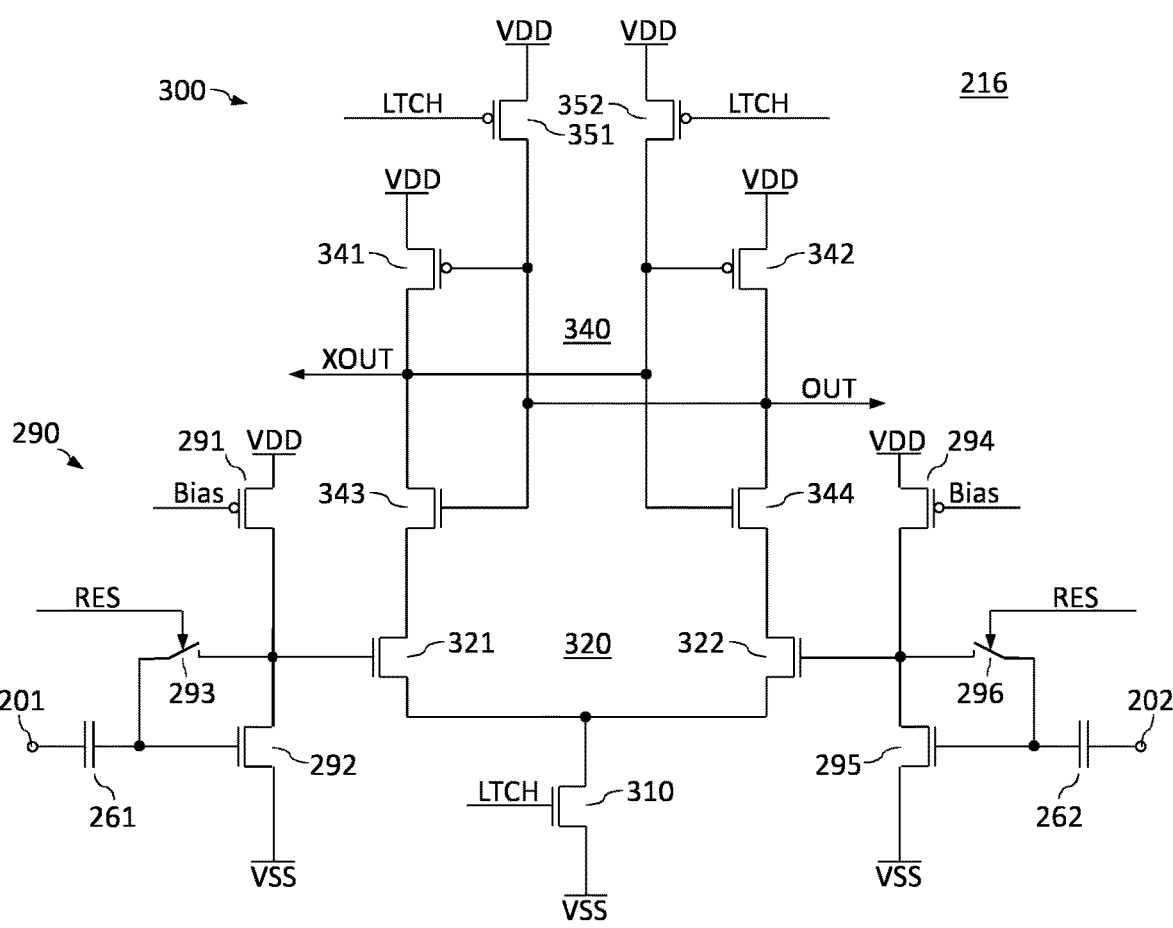
FIG. 20 shows a circuit diagram of the differential amplifier circuit and the comparator/latch circuit of FIG. 19 according to an embodiment.

FIG. 20 shows a combination of the latch comparator 216 of FIG. 13 with a preamplifier stage similar to that in FIG. 14 in each input leg of the latch comparator 216.

The preamplifier circuit 290 includes a first preamplifier stage in the input leg connected to the first input 201 of the column readout circuit and a second preamplifier stage in the input leg connected to the second input 202.

The first preamplifier stage includes a first amplifier transistor 292 and a first amplifier load 291, wherein the first amplifier load 291 and a load path of the first amplifier transistor 292 are electrically connected in this order in series between the high supply potential VDD and the low supply potential VSS. The first amplifier load 291 may include a pFET with constant gate bias Bias.

A first capacitive element 261 couples the pixel event signal EV to an input of the first preamplifier stage, wherein in the illustrated embodiment the input of the first preamplifier stage is the gate of the first amplifier transistor 292. The output of the first preamplifier stage between the first amplifier load 291 and the drain of the first amplifier transistor 292 is connected to the gate of the first input transistor 321 of the latch comparator. A first preamplifier reset switch 293 is connected between the input and the output of the first preamplifier stage.

The second preamplifier stage includes a second amplifier transistor 295 and a second amplifier load 294, wherein the second amplifier load 294 and a load path of the second amplifier transistor 295 are electrically connected in this order in series between the high supply potential VDD and the low supply potential VSS. The second amplifier load 294 may include a pFET with constant gate bias Bias.

A second capacitive element 262 couples the inverted pixel event signal XEV to an input of the second preamplifier stage, wherein in the illustrated embodiment the input of the second preamplifier stage is the gate of the second amplifier transistor 295. The output of the second preamplifier stage between the second amplifier load 294 and the drain of the second amplifier transistor 295 is connected to the gate of the second input transistor 323 of the latch comparator 216. A second preamplifier reset switch 296 is connected between the input and the output of the second preamplifier stage.

An active reset signal RES turns on the first preamplifier reset switch 293 to connect the input and the output of the first preamplifier stage for a reset period, and turns on the second preamplifier reset switch 296 to connect the input and the output of the second preamplifier stage for the reset period.

Figure 21:
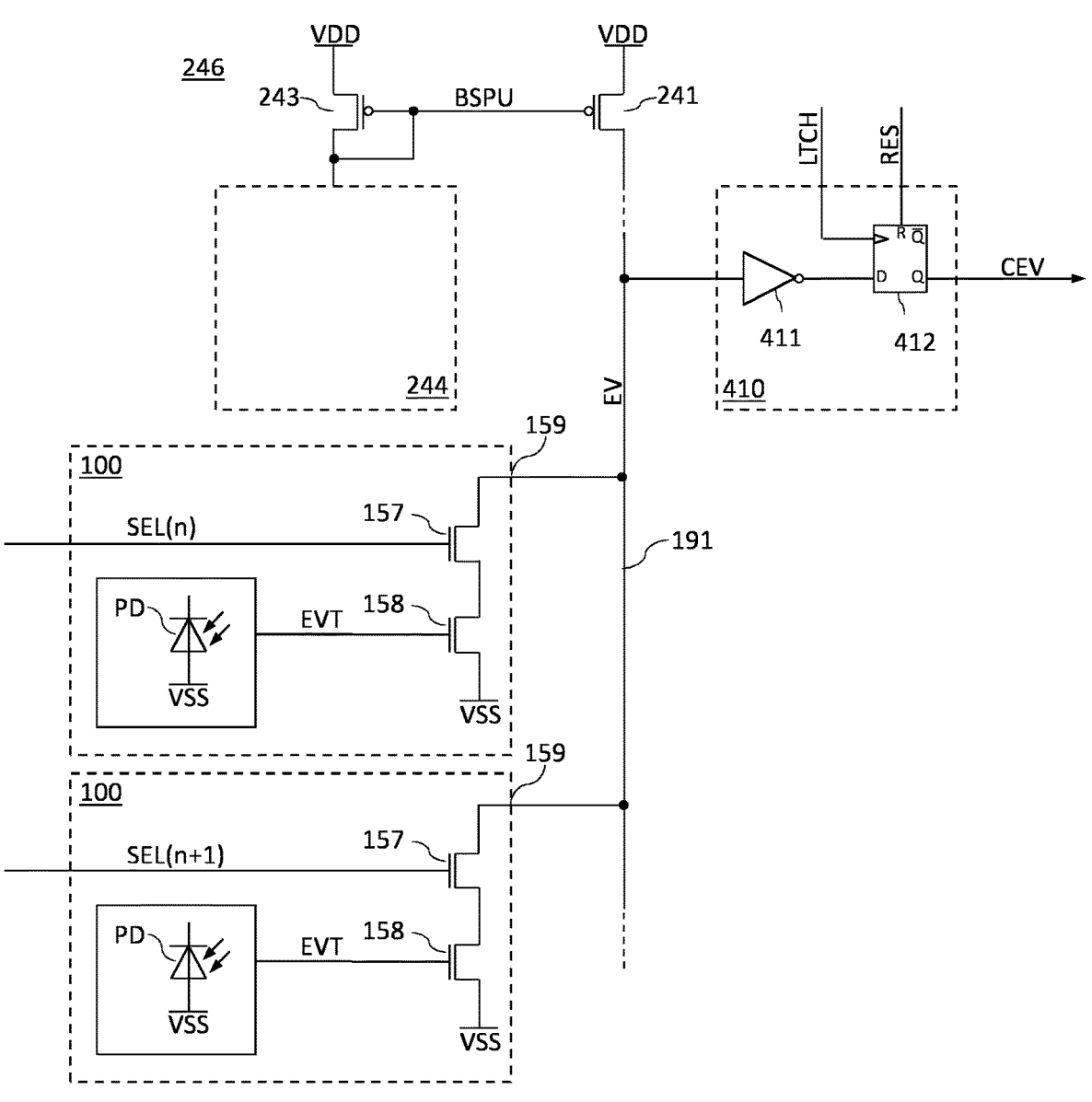
FIG. 21 shows a simplified block diagram of a portion of an image sensor having a current source circuit electrically connected to a column signal line and including a mockup circuit according to an embodiment related to a column readout circuit based on a CMOS inverter circuit.

FIG. 21 combines a bias voltage circuit 246 as described with reference to FIG. 5 and FIG. 6 with a column readout circuit 20 including a CMOS inverter.

The image sensor includes a plurality of pixel circuits 100 for event detection, wherein each pixel circuit 100 includes an output transistor 158 and a selection transistor 157 electrically connected in series between a pixel output 159 and a first supply potential VSS. A column signal line 191 electrically connects the pixel outputs 159 of the plurality of pixel circuits 100. A current source circuit 240 includes a current source transistor 241 electrically connected between the column signal line 191 and a second supply potential VDD, wherein the current source circuit 240 includes a bias voltage circuit 246 that passes a supply voltage dependent bias voltage to the gate of the current source transistor 241. The bias voltage circuit 246 includes a complementary current source transistor 243 electrically connected between the second supply potential VDD and a mockup circuit 244, wherein the mockup circuit 244 emulates the plurality of parallel connections of the output transistor 158 and the selection transistor 157 electrically connected in series between the pixel output 159 and the first supply potential VSS. A gate of the current source transistor 241, a gate of the complementary current source transistor 243 and a node between a load path of the complementary current source transistor 243 and the mockup circuit 244 are electrically connected.

An alternative column readout circuit 410 includes a CMOS inverter 411. The pixel event signal is passed to an input of the CMOS inverter 411. A latch element 412 latches the output signal of the CMOS inverter 411 in response to an active latch signal LTCH.

Figure 22:
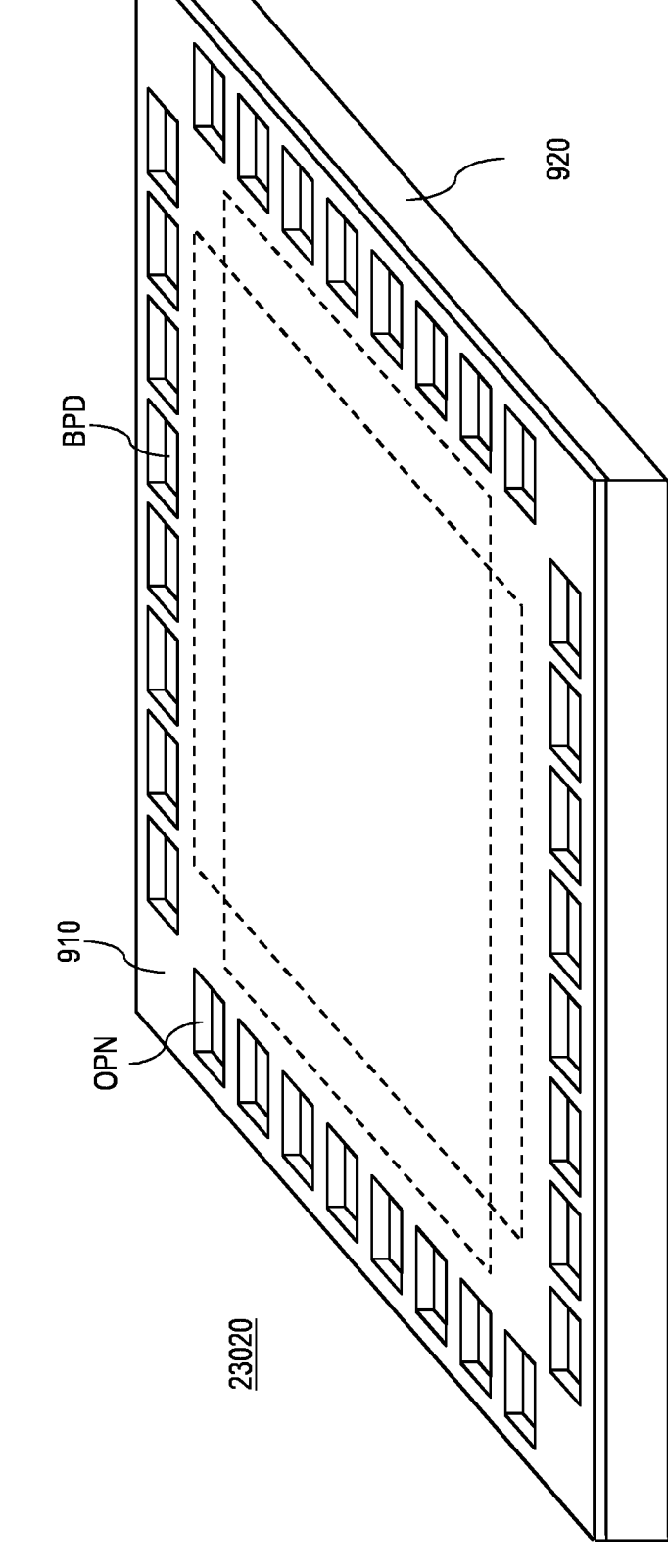
FIG. 22 is a diagram showing an example of a laminated structure of an image sensor according to an embodiment of the present disclosure.

FIG. 22 is a perspective view showing an example of a laminated structure of a solid-state imaging device 23020 with a plurality of pixels arranged matrix-like in array form. Each pixel includes at least one photoelectric conversion element.

The solid-state imaging device 23020 has the laminated structure of a first chip (upper chip) 910 and a second chip (lower chip) 920.

The laminated first and second chips 910, 920 may be electrically connected to each other through TC(S)Vs (Through Contact (Silicon) Vias) formed in the first chip 910.

The solid-state imaging device 23020 may be formed to have the laminated structure in such a manner that the first and second chips 910 and 920 are bonded together at wafer level and cut out by dicing.

In the laminated structure of the upper and lower two chips, the first chip 910 may be an analog chip (sensor chip) including at least one analog component of each pixel circuit, e.g., the photoelectric conversion elements arranged in array form.

For example, the first chip 910 may include only the photoelectric conversion elements of the pixel circuits as described above with reference to the preceding FIGS. Alternatively, the first chip 910 may include further elements of each pixel circuit. For example, the first chip 910 may include each element of the pixel circuit.

The second chip 920 may be mainly a logic chip (digital chip) that includes the elements complementing the elements on the first chip 910 to complete pixel circuits and current control circuits. The second chip 920 may also include analog circuits, for example circuits that quantize analog signals transferred from the first chip 910 through the TCVs.

The second chip 920 may have one or more bonding pads BPD and the first chip 910 may have openings OPN for use in wire-bonding to the second chip 920.

The solid-state imaging device 23020 with the laminated structure of the two chips 910, 920 may have the following characteristic configuration:

The electrical connection between the first chip 910 and the second chip 920 is performed through, for example, the TCVs. The TCVs may be arranged at chip ends or between a pad region and a circuit region. The TCVs for transmitting control signals and supplying power may be mainly concentrated at, for example, the four corners of the solid-state imaging device 23020, by which a signal wiring area of the first chip 910 can be reduced.

Figure 23:
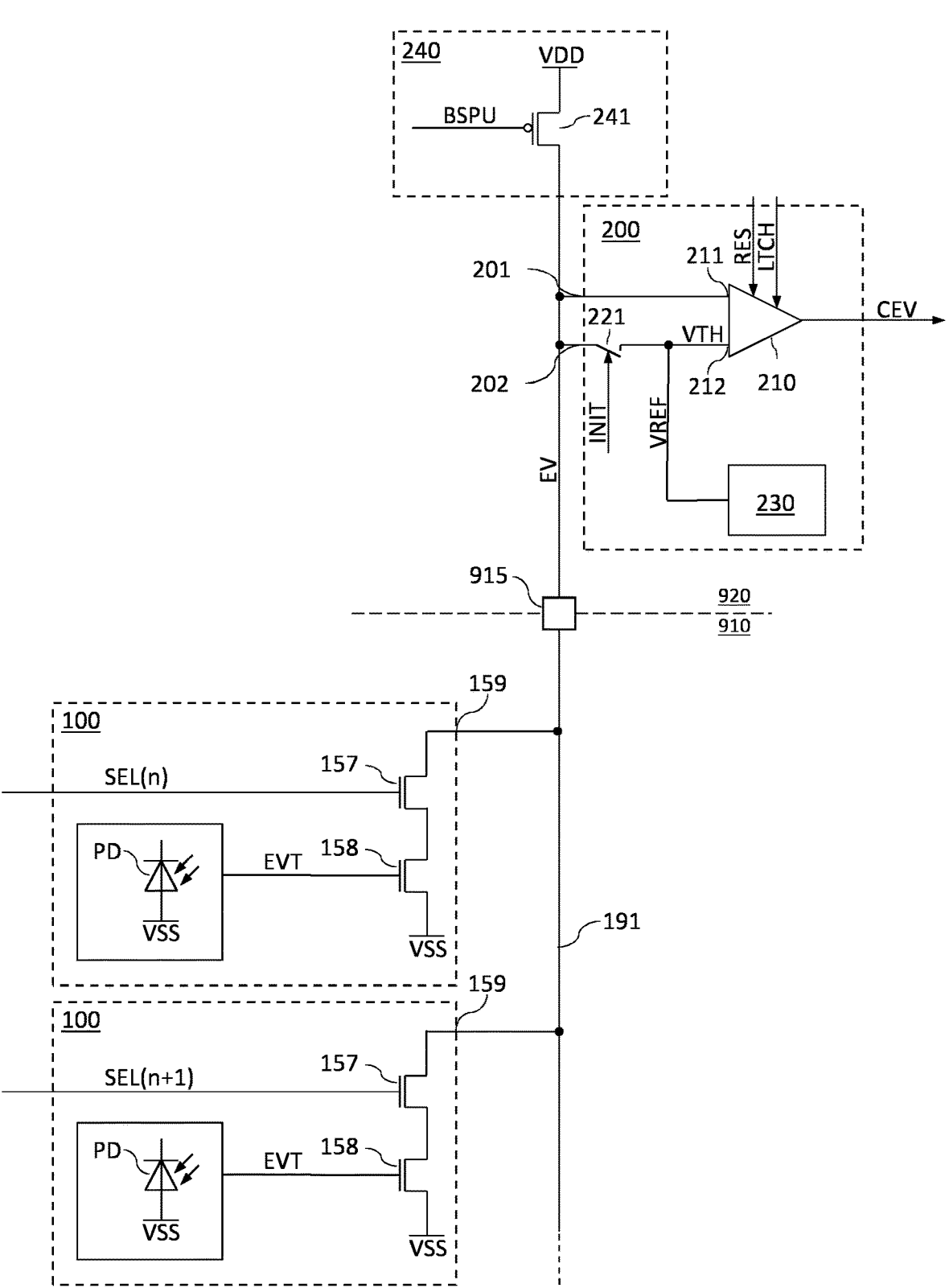
FIG. 23 shows a block diagram indicating a distribution of circuit elements of an image sensor across the substrate portions of the laminated structure of FIG. 22 according to an embodiment.

FIG. 23 shows a possible allocation of elements of an image sensor across the first chip 910 and the second chip 920 of FIG. 22.

The first chip 910 may include the pixel circuits 100 with the photoelectric conversion elements PD. The second chip 920 may include inter alia the column signal processing units 200 and the constant current circuits 240. One through contact via 915 per pixel column may be part of the column signal line 191 and passes the pixel event signal EV from the first chip 910 to the second chip 920.

Figure 24:
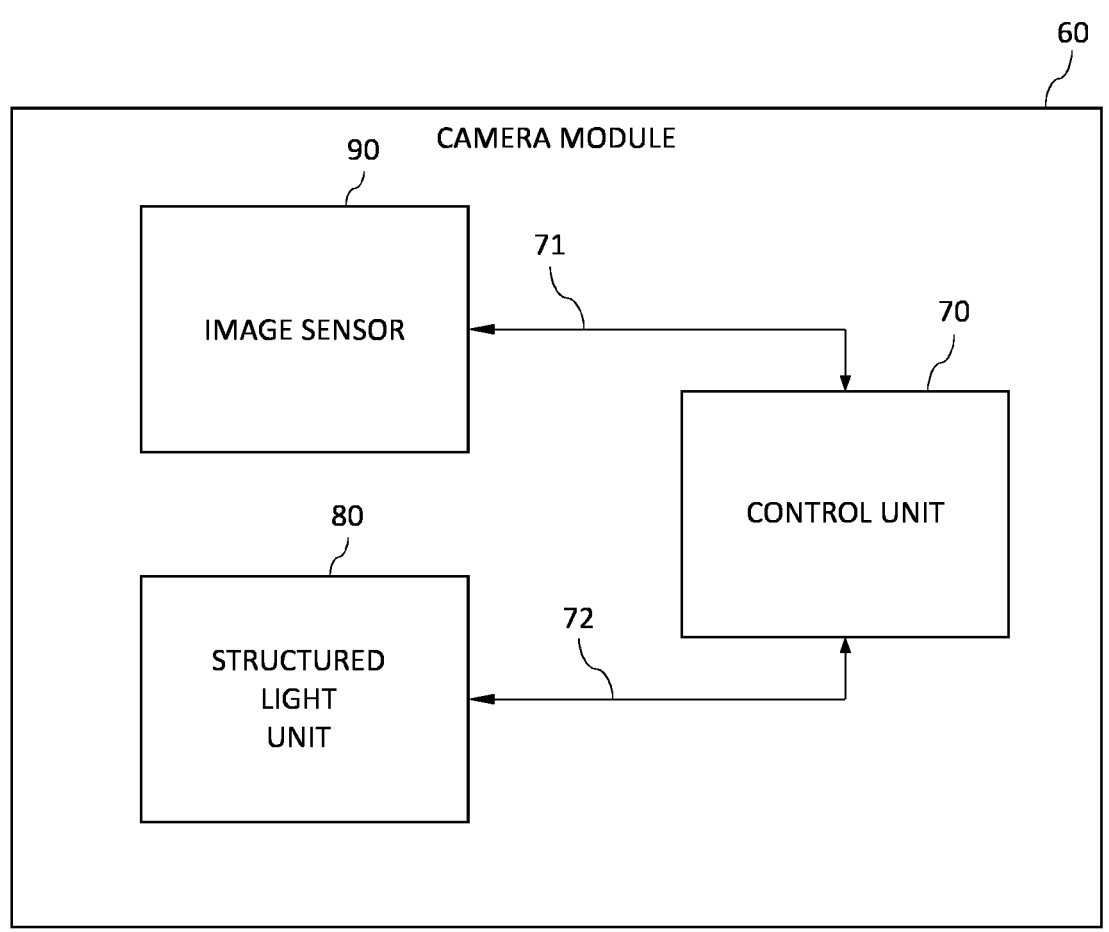
FIG. 24 is a block diagram depicting an example of a schematic configuration of a camera module using structured light.

FIG. 24 shows a camera module 60 that includes a control unit 70, a structured light unit 80, and an image sensor 90. The control unit 70 controls the structured light unit 80 to emit structured light, e.g. a pattern generated by a moving laser beam. The control unit 70 further controls the image sensor 90 to receive the reflected structured light in synchronization with the emission of the structured light. The image sensor detects image information about the imaged scene and transmits the detected image information to the control unit 70. An image sensor 70 including the comparator/latch circuit as described above allows a scanning of the imaged scene with high temporal resolution.

Figure 25:
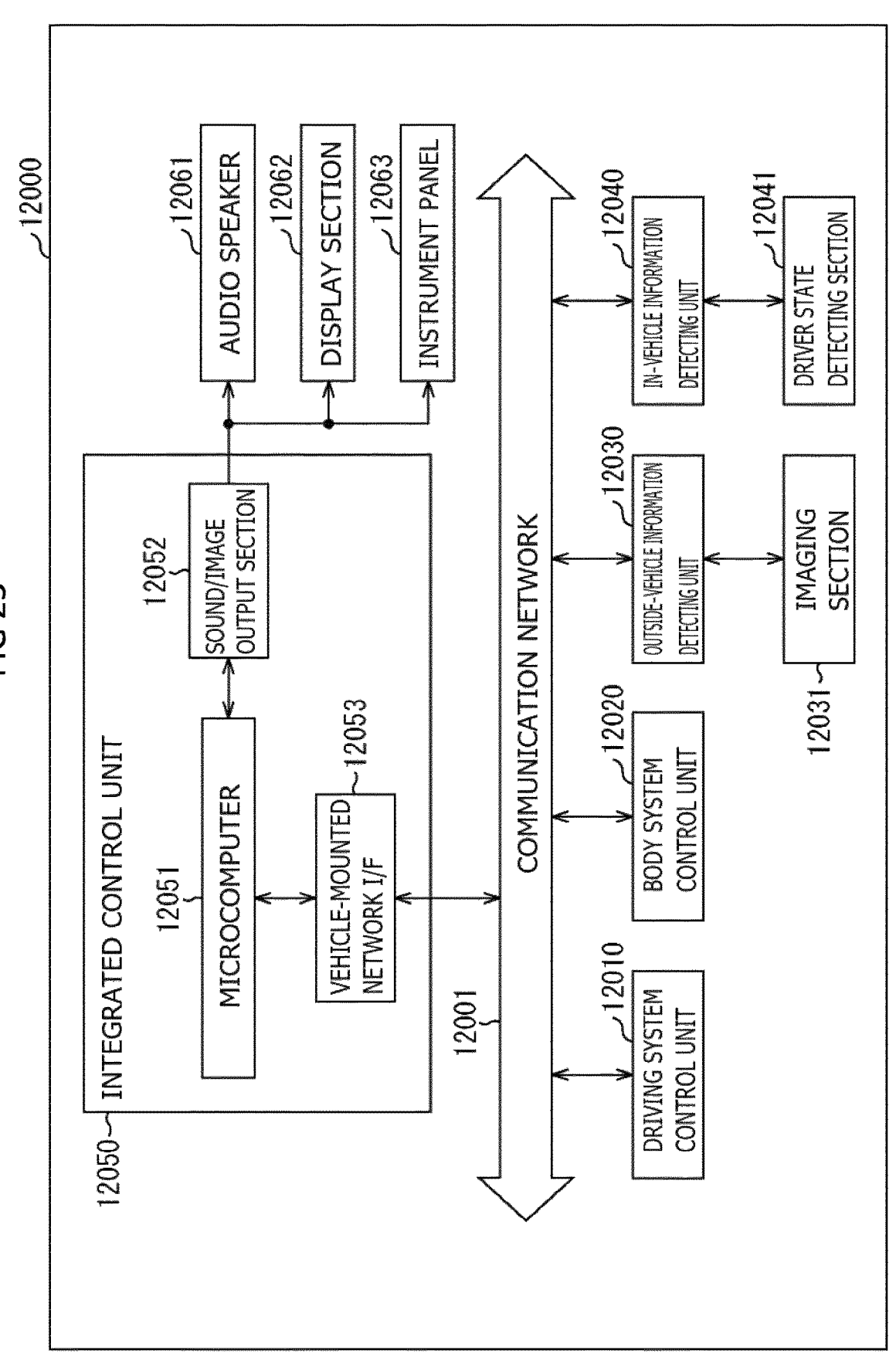
FIG. 25 shows a schematic block diagram depicting an example of a schematic configuration of a vehicle control system.

FIG. 25 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 25, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 imaging an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 may be or may include an image sensor assembly or a solid-state imaging device with a column readout circuit with comparator/latch circuit according to the embodiments of the present disclosure. The light received by the imaging section 12031 may be visible light, or may be invisible light such as infrared rays or the like.

The in-vehicle information detecting unit 12040 detects information about the inside of the vehicle and may be or may include an image sensor assembly or a solid-state imaging device with a column readout circuit with comparator/latch circuit according to the embodiments of the present disclosure. The in-vehicle information detecting unit 12040 is, for example, connected with a driver state detecting section 12041 that detects the state of a driver. The driver state detecting section 12041, for example, includes a camera that includes the solid-stage imaging device and that is focused on the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound or an image to an output device capable of visually or audible notifying information to an occupant of the vehicle or the outside of the vehicle. In the example of FIG. 25, an audio speaker 12061, a display section 12062, and an instrument panel 12063 are illustrated as the output device. The display section 12062 may, for example, include at least one of an on-board display or a head-up display.

Figure 26:
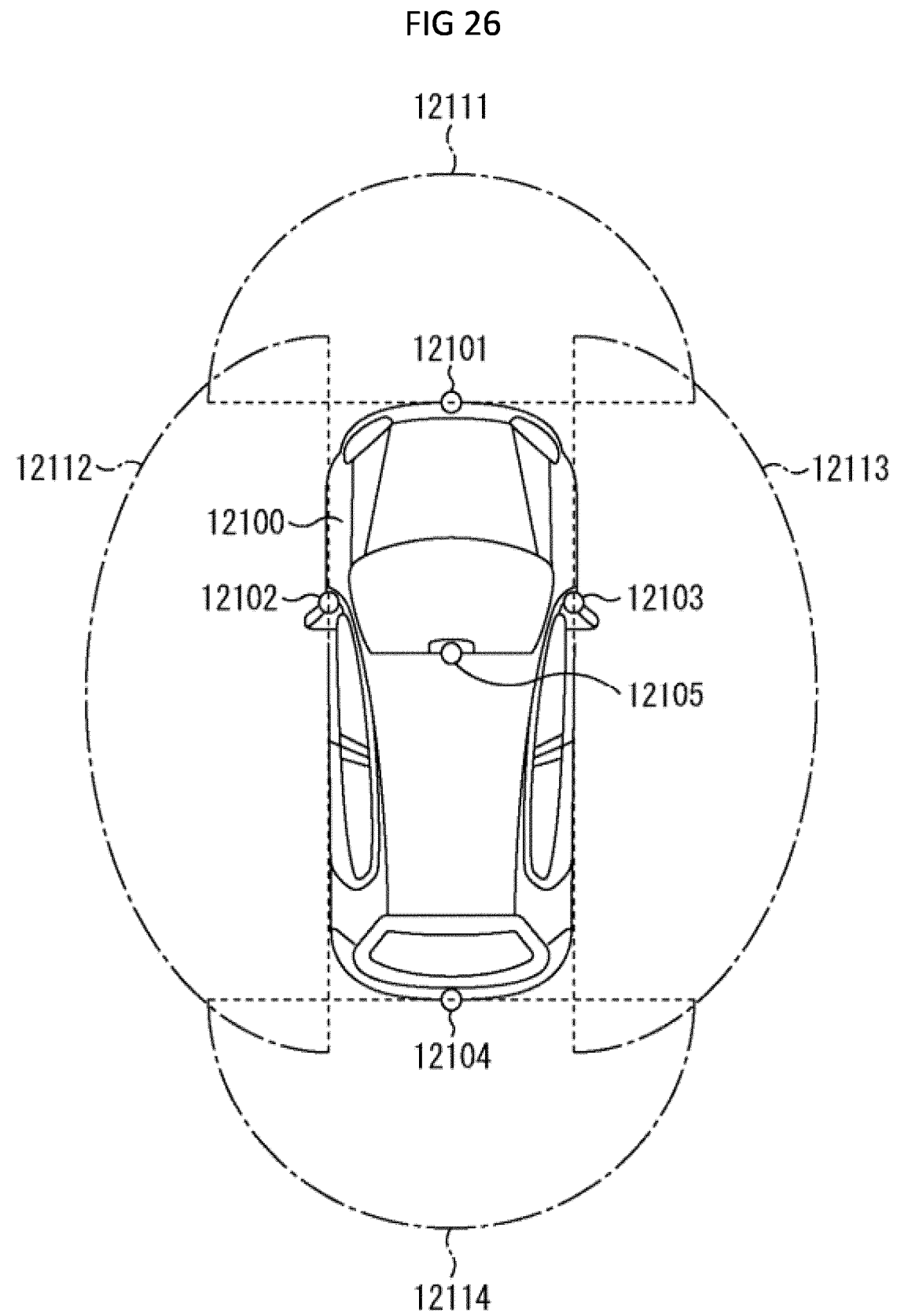
FIG. 26 is a diagram of assistance in explaining an example of installation positions of an outside-vehicle information detecting section and an imaging section of the vehicle control system of FIG. 25.

FIG. 26 is a diagram depicting an example of the installation position of the imaging section 12031, wherein the imaging section 12031 may include imaging sections 12101, 12102, 12103, 12104, and 12105.

The imaging sections 12101, 12102, 12103, 12104, and 12105 are, for example, disposed at positions on a front nose, side-view mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the side view mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 26 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the side view mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, imaging element having pixels for phase difference detection or may include a ToF module including an image sensor assembly or a solid-state imaging device with a column readout circuit with comparator/latch circuit according to the embodiments of the present disclosure.

For example, the microcomputer 12051 can determine a distance to each three-dimensional object within the imaging ranges 12111 to 12114 and a temporal change in the distance (relative speed with respect to the vehicle 12100 on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle

12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to an embodiment of the present disclosure is applicable has been described above. By applying an image sensor assembly or a solid-state imaging device with a column readout circuit with comparator/latch circuit according to the embodiments of the present disclosure, the sensors can be readout at higher frame rates.

Additionally, embodiments of the present technology are not limited to the above-described embodiments, but various changes can be made within the scope of the present technology without departing from the gist of the present technology.

The solid-state imaging device according to the present disclosure may be any device used for analyzing and/or processing radiation such as visible light, infrared light, ultraviolet light, and X-rays. For example, the solid-state imaging device may be any electronic device in the field of traffic, the field of home appliances, the field of medical and healthcare, the field of security, the field of beauty, the field of sports, the field of agriculture, the field of image reproduction or the like.

Specifically, in the field of image reproduction, the solid-state imaging device may be a device for capturing an image to be provided for appreciation, such as a digital camera, a smart phone, or a mobile phone device having a camera function. In the field of traffic, for example, the solid-state imaging device may be integrated in an in-vehicle sensor that captures the front, rear, peripheries, an interior of the vehicle, etc. for safe driving such as automatic stop, recognition of a state of a driver, or the like, in a monitoring camera that monitors traveling vehicles and roads, or in a distance measuring sensor that measures a distance between vehicles or the like.

In the field of home appliances, the solid-state imaging device may be integrated in any type of sensor that can be used in devices provided for home appliances such as TV receivers, refrigerators, and air conditioners to capture gestures of users and perform device operations according to the gestures. Accordingly the solid-state imaging device may be integrated in home appliances such as TV receivers, refrigerators, and air conditioners and/or in devices controlling the home appliances. Furthermore, in the field of medical and healthcare, the solid-state imaging device may be integrated in any type of sensor, e.g. a solid-state image device, provided for use in medical and healthcare, such as an endoscope or a device that performs angiography by receiving infrared light.

In the field of security, the solid-state imaging device can be integrated in a device provided for use in security, such as a monitoring camera for crime prevention or a camera for person authentication use. Furthermore, in the field of beauty, the solid-state imaging device can be used in a device provided for use in beauty, such as a skin measuring instrument that captures skin or a microscope that captures a probe. In the field of sports, the solid-state imaging device can be integrated in a device provided for use in sports, such as an action camera or a wearable camera for sport use or the like. Furthermore, in the field of agriculture, the solid-state imaging device can be used in a device provided for use in agriculture, such as a camera for monitoring the condition of fields and crops.

The present technology can also be configured as described below:

(1) An image sensor, including: a plurality of pixel circuits for event detection, wherein each pixel circuit includes at least one output transistor and at least one selection transistor electrically connected in series between at least one pixel output and a first supply potential; a column signal line electrically connecting the pixel outputs of the plurality of pixel circuits; and a comparator/latch circuit configured to receive a signal derived from a pixel event signal transmitted on the column signal line at a first comparator input, and to output a latched active column event signal, when the signal at the first comparator input exceeds or falls below a threshold voltage applied to a second comparator input of the comparator/latch circuit.

(2) The image sensor according to (1), further including: a first switch element configured to electrically couple the column signal line and the second comparator input via a low impedance path in response to an initialization signal.

(3) The image sensor according to any of (1) to (2), further including: a reference voltage source configured to generate a constant reference voltage, wherein the threshold voltage is derivable from the reference voltage.

(4) The image sensor according to any of (1) to (3), further including: a current source circuit including a current source transistor electrically connected between the column signal line and a second supply potential.

(5) The image sensor according to (4), wherein the current source circuit includes a bias voltage circuit configured to pass a supply voltage dependent bias voltage to the gate of the current source transistor.

(6) The image sensor according any of (1) to (5), further including: a bias disabling circuit configured to disable biasing of the column signal line in response to a bias disable signal.

(7) The image sensor according to any of (1) to (6), wherein each pixel circuit includes a pixel photocurrent circuit configured to output a pixel voltage signal proportional to incoming light intensity, a voltage buffer configured to generate a shifted pixel signal by shifting a voltage level of the pixel voltage signal by an amount determined by a voltage level of the pixel voltage signal at a reset time, and a pixel logic circuit configured to output the pixel event signal based on a result of comparisons of the shifted pixel signal with a first reference voltage and a second reference voltage.

(8) The image sensor according to any of (1) to (7), further including: a voltage bias element configured to cause a voltage bias at the first comparator input or the second comparator input.

(9) The image sensor according to any of (1) to (8), further including: a first switch element configured to electrically couple the column signal line and the second comparator input via a low impedance path in response to an initialization signal; a capacitive element configured to couple the pixel event signal to the first comparator input, and a second switch element configured to electrically couple the first comparator input and the second comparator input via a low impedance path in response to the initialization signal;

(10) The image sensor according to any of (1) to (9), wherein the comparator/latch circuit includes a comparator circuit and a latch circuit, wherein the latch circuit is configured to latch a comparator output signal of the comparator circuit in response to a trailing and/or falling edge of a latch signal.

(11) The image sensor according to any of (1) to (10), wherein the comparator/latch circuit includes a latch comparator, wherein the latch comparator includes a tail transistor and a differential pair, wherein the differential pair includes a first input transistor and a second input transistor, wherein the first comparator input is connected to a gate of the first input transistor, wherein the second comparator input is connected to a gate of the second input transistor, and wherein load paths of the differential pair are connected in parallel to each other between a hold circuit and a load path of the tail transistor.

(12) The image sensor according to (11), further including: a capacitive element and a preamplifier circuit, wherein the capacitive element is configured to pass the pixel event signal to an input of the preamplifier circuit, and wherein the preamplifier circuit is configured to amplify the pixel event signal passed to the input of the preamplifier circuit and to supply an amplified pixel event signal to the first comparator input or the second comparator input.

(13) The image sensor according to (12), wherein the preamplifier circuit is further configured to electrically connect the first comparator input, the second comparator input and the input of the preamplifier circuit in response to an active reset signal.

(14) The image sensor according to any of (1) to (13), further including: a transimpedance amplifier circuit including an operational amplifier, wherein the operational amplifier is configured to receive the pixel event signal at one of a non-inverting input and an inverting input, and a reference voltage at another one of the non-inverting input and the inverting input, and wherein the transimpedance amplifier circuit is configured to pass a signal derived from an output signal of the operational amplifier to the first comparator input of the comparator/latch circuit.

(15) The image sensor according to any of (1) to (14), wherein each pixel circuit includes a complementary output transistor and a complementary selection transistor electrically connected in series between a complementary pixel output and the first supply potential, and wherein the image sensor further includes: a complementary column signal line electrically connecting the complementary pixel outputs of the plurality of pixel circuits, and wherein the comparator/latch circuit is further configured to receive a signal derived from a complementary pixel event signal transmitted on the complementary column signal line at the second comparator input.

The invention claimed is:

1. An image sensor, comprising:
   a plurality of pixel circuits for event detection, wherein each pixel circuit comprises at least one output transistor and at least one selection transistor electrically connected in series between at least one pixel output and a first supply potential;
   a column signal line electrically connecting the pixel outputs of the plurality of pixel circuits; and
   a comparator/latch circuit configured to receive a signal derived from a pixel event signal transmitted on the column signal line at a first comparator input, and to output a latched active column event signal, when the signal at the first comparator input exceeds or falls below a threshold voltage applied to a second comparator input of the comparator/latch circuit.

2. The image sensor according to claim 1, further comprising:
   a first switch element configured to electrically couple the column signal line and the second comparator input via a low impedance path in response to an initialization signal.

3. The image sensor according to claim 1, further comprising:
   a reference voltage source configured to generate a constant reference voltage, wherein the threshold voltage is derivable from the reference voltage.

4. The image sensor according to claim 1, further comprising:
   a current source circuit comprising a current source transistor electrically connected between the column signal line and a second supply potential.

5. The image sensor according to claim 4, wherein the current source circuit comprises a bias voltage circuit configured to pass a supply voltage dependent bias voltage to the gate of the current source transistor.

6. The image sensor according to claim 1, further comprising:

a bias disabling circuit configured to disable biasing of the column signal line in response to a bias disable signal.

7. The image sensor according to claim 1, wherein each pixel circuit comprises a pixel photocurrent circuit configured to output a pixel voltage signal proportional to incoming light intensity, a voltage buffer configured to generate a shifted pixel signal by shifting a voltage level of the pixel voltage signal by an amount determined by a voltage level of the pixel voltage signal at a reset time, and a pixel logic circuit configured to output the pixel event signal based on a result of comparisons of the shifted pixel signal with a first reference voltage and a second reference voltage.

8. The image sensor according to claim 1, further comprising:

a voltage bias element configured to cause a voltage bias at the first comparator input or the second comparator input.

9. The image sensor according to claim 1, further comprising:

a first switch element configured to electrically couple the column signal line and the second comparator input via a low impedance path in response to an initialization signal;

a capacitive element configured to couple the pixel event signal to the first comparator input, and a second switch element configured to electrically couple the first comparator input and the second comparator input via a low impedance path in response to the initialization signal.

10. The image sensor according to claim 1, wherein the comparator/latch circuit comprises a comparator circuit and a latch circuit, wherein the latch circuit is configured to latch a comparator output signal of the comparator circuit in response to a trailing and/or falling edge of a latch signal.

11. The image sensor according to claim 1, wherein the comparator/latch circuit comprises a latch comparator, wherein the latch comparator includes a tail transistor and a differential pair, wherein the differential pair comprises a first input transistor and a second input transistor, wherein the first comparator input is connected to a gate of the first input transistor, wherein the second comparator input is connected to a gate of the second input transistor, and wherein load paths of the differential pair are connected in parallel to each other between a hold circuit and a load path of the tail transistor.

12. The image sensor according to claim 11, further comprising:

a capacitive element and a preamplifier circuit, wherein the capacitive element is configured to pass the pixel event signal to an input of the preamplifier circuit, and wherein the preamplifier circuit is configured to amplify the pixel event signal passed to the input of the preamplifier circuit and to supply an amplified pixel event signal to the first comparator input or the second comparator input.

13. The image sensor according to claim 12, wherein the preamplifier circuit is further configured to electrically connect the first comparator input, the second comparator input and the input of the preamplifier circuit in response to an active reset signal.

14. The image sensor according to claim 1, further comprising:

a transimpedance amplifier circuit comprising an operational amplifier, wherein the operational amplifier is configured to receive the pixel event signal at one of a non-inverting input and an inverting input, and a reference voltage at another one of the non-inverting input and the inverting input, and wherein the transimpedance amplifier circuit is configured to pass a signal derived from an output signal of the operational amplifier to the first comparator input of the comparator/latch circuit.

15. The image sensor according to claim 1, wherein each pixel circuit comprises a complementary output transistor and a complementary selection transistor electrically connected in series between a complementary pixel output and the first supply potential, and wherein the image sensor further comprises:

a complementary column signal line electrically connecting the complementary pixel outputs of the plurality of pixel circuits, and wherein the comparator/latch circuit is further configured to receive a signal derived from a complementary pixel event signal transmitted on the complementary column signal line at the second comparator input.

* * * * *